US012240235B2

(12) United States Patent
Katakura et al.

(10) Patent No.: US 12,240,235 B2
(45) Date of Patent: Mar. 4, 2025

(54) DETERMINATION METHOD AND LIQUID EJECTING APPARATUS

(71) Applicant: SEIKO EPSON CORPORATION, Tokyo (JP)

(72) Inventors: Takahiro Katakura, Okaya (JP); Toshiro Murayama, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 184 days.

(21) Appl. No.: 18/180,005

(22) Filed: Mar. 7, 2023

(65) Prior Publication Data

US 2023/0286267 A1 Sep. 14, 2023

(30) Foreign Application Priority Data

Mar. 8, 2022 (JP) ................................ 2022-035029

(51) Int. Cl.
*B41J 2/045* (2006.01)

(52) U.S. Cl.
CPC ....... *B41J 2/04581* (2013.01); *B41J 2/04541* (2013.01)

(58) Field of Classification Search
CPC ................ B41J 2/04581; B41J 2/04541; B41J 2/04571; B41J 2002/14491; B41J 2/0459; B41J 2/04591; B41J 2002/14354; B41J 2/04596; B41J 2/14233; B41J 2/04588; B41J 2/04593
See application file for complete search history.

(56) References Cited

U.S. PATENT DOCUMENTS

2017/0173948 A1* 6/2017 Fujisawa ............. B41J 2/14201

FOREIGN PATENT DOCUMENTS

JP 2010-194834 A 9/2010

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A determination method of determining a supply signal to be supplied to a first electrode and a second electrode includes an acquisition step of acquiring, when a predetermined condition is satisfied, first information regarding a liquid ejection characteristic when a first constant potential signal of a first potential is supplied to the second electrode, and second information regarding a liquid ejection characteristic when a second constant potential signal of a second potential different from the first potential is supplied to the second electrode, and a determination step of determining, based on the first information and the second information, the supply signal to be supplied to the first electrode and the second electrode after the predetermined condition is satisfied.

9 Claims, 17 Drawing Sheets

FIG. 10

| Sd[m] | CONTENT SPECIFIED BY Sd[m] | SLa[m] | SLb[m] | | | SLs[m] | | |
|---|---|---|---|---|---|---|---|---|
| | | | TSS1 | TSS2 | TSS3 | TSS1 | TSS2 | TSS3 |
| (1, 0) | EJECTION OF INK | H | L | L | L | L | L | L |
| (0, 0) | NON-EJECTION OF INK | L | L | L | L | L | L | L |
| (1, 1) | DRIVING AS DETECTION TARGET EJECTING UNIT | L | H | L | H | L | H | L |

FIG. 11

| dCom | ΔVe | Vm, VLX, AND VHX CORRESPONDING TO ΔVe |
|---|---|---|
| dC0 | 0[V] | Vm=10[V],VLX=-5[V],VHX=25[V] |
| ... | ... | ... |
| dC3 | -3[V] | Vm=7[V],VLX=-8[V],VHX=22[V] |
| ... | ... | ... |
| dC5 | -5[V] | Vm=5[V],VLX=-10[V],VHX=20[V] |

FIG. 12

| dVbs | ΔVe | Vct CORRESPONDING TO ΔVe |
|---|---|---|
| dV0 | 0[V] | -5[V] |
| ... | ... | ... |
| dV3 | -3[V] | -8[V] |
| ... | ... | ... |
| dV5 | -5[V] | -10[V] |

FIG. 20

| dCom | ΔVe | ΔVr CORRESPONDING TO ΔVe |
|---|---|---|
| dC0 | 0[V] | 0[V] |
| ... | ... | ... |
| dC3 | 3[V] | 3[V] |
| ... | ... | ... |
| dC5 | 5[V] | 5[V] |

DETERMINATION METHOD AND LIQUID EJECTING APPARATUS

The present application is based on, and claims priority from JP Application Serial Number 2022-035029, filed Mar. 8, 2022, the disclosure of which is hereby incorporated by reference herein in its entirety.

BACKGROUND

1. Technical Field

The present disclosure relates to a determination method and a liquid ejecting apparatus.

2. Related Art

A liquid ejecting apparatus has been disclosed, which includes a liquid ejecting head having a pressure chamber in which liquid such as ink is stored, a piezoelectric body that changes pressure applied to the liquid in the pressure chamber, and a first electrode and a second electrode that drive the piezoelectric body. The liquid ejecting apparatus ejects the liquid from the liquid ejecting head by supplying a supply signal to the first electrode and the second electrode. For example, JP-A-2010-194834 describes a phenomenon in which an amount of deformation of a piezoelectric body decreases according to the number of times that the piezoelectric body is driven. JP-A-2010-194834 discloses a liquid ejecting apparatus that corrects, based on this phenomenon, a supply signal based on the number of times that the piezoelectric body is driven.

However, in the existing technique described above, a decrease in the amount of deformation of the piezoelectric body cannot be identified based on only the number of times that the piezoelectric body is driven, and varies depending on a manufacturing error of the piezoelectric body, the temperature of the piezoelectric body, and the like, and thus a supply signal to eject an appropriate amount of liquid may not be applied to the first electrode and the second electrode.

SUMMARY

In order to solve the problems described above, according to an aspect of the present disclosure, a determination method of determining a supply signal to be supplied to a first electrode and a second electrode in order to eject liquid from a liquid ejecting head including a first pressure chamber in which the liquid is stored, a first piezoelectric body that changes pressure applied to the liquid in the first pressure chamber, and the first electrode and the second electrode that drive the piezoelectric body includes an acquisition step of acquiring, when a predetermined condition is satisfied, first information regarding a liquid ejection characteristic when a first constant potential signal of a first potential is supplied to the second electrode and second information regarding a liquid ejection characteristic when a second constant potential signal of a second potential different from the first potential is supplied to the second electrode; and a determination step of determining, based on the first information and the second information, the supply signal to be supplied to the first electrode and the second electrode after the predetermined condition is satisfied.

According to another aspect of the present disclosure, a liquid ejecting apparatus includes a liquid ejecting head including a first pressure chamber in which liquid is stored, a first piezoelectric body that changes pressure applied to the liquid in the first pressure chamber, and a first electrode and a second electrode that drive the first piezoelectric body, and a controller that determines a supply signal to be supplied to the first electrode and the second electrode. When a predetermined condition is satisfied, the controller acquires first information regarding a liquid ejection characteristic when a first constant potential signal of a first potential is supplied to the second electrode and second information regarding a liquid ejection characteristic when a second constant potential signal of a second potential different from the first potential is supplied to the second electrode. The controller determines, based on the first information and the second information, the supply signal to be supplied to the first electrode and the second electrode after the predetermined condition is satisfied.

BRIEF DESCRIPTION OF THE DRAWINGS

FIG. 10 is an explanatory diagram for explaining generation of coupling state specifying signals.

FIG. 11 is a diagram illustrating an example of a correction value corresponding to a waveform specifying signal.

FIG. 12 is a diagram illustrating an example of a correction value corresponding to a constant potential specifying signal.

FIG. 20 is a diagram for explaining an eleventh modification.

DESCRIPTION OF EXEMPLARY EMBODIMENTS

Hereinafter, embodiments of the present disclosure are described with reference to the drawings. However, in each of the drawings, dimensions and scale of each unit are different from the actual dimensions and the actual scale. In addition, since the embodiments described below are specific examples of the present disclosure, various technically preferred limitations are given in the embodiments. However, the scope of the present disclosure is not limited to the embodiments unless there is a description to the effect that the present disclosure is particularly limited in the following description.

1. First Embodiment

The present embodiment describes a liquid ejecting apparatus while exemplifying an ink jet printer 1 that ejects ink to form an image on a recording sheet P. The ink jet printer 1 is an example of the "liquid ejecting apparatus". The ink is an example of "liquid". The recording sheet P is an example of a "medium".

1.1. Overview of Ink Jet Printer 1

Figure 1:
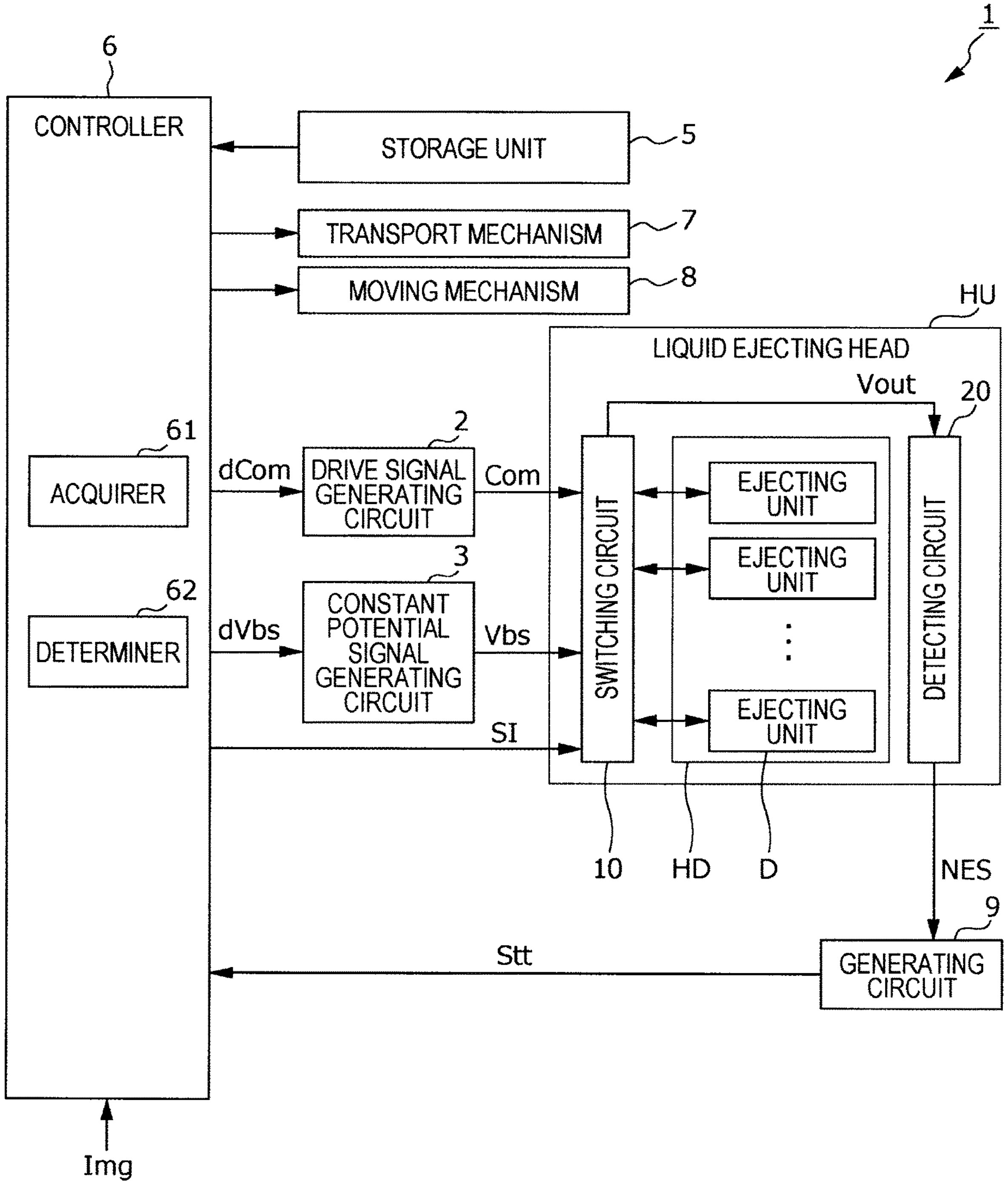
FIG. 1 is a functional block diagram illustrating an example of a configuration of an ink jet printer according to an embodiment.
Figure 2:
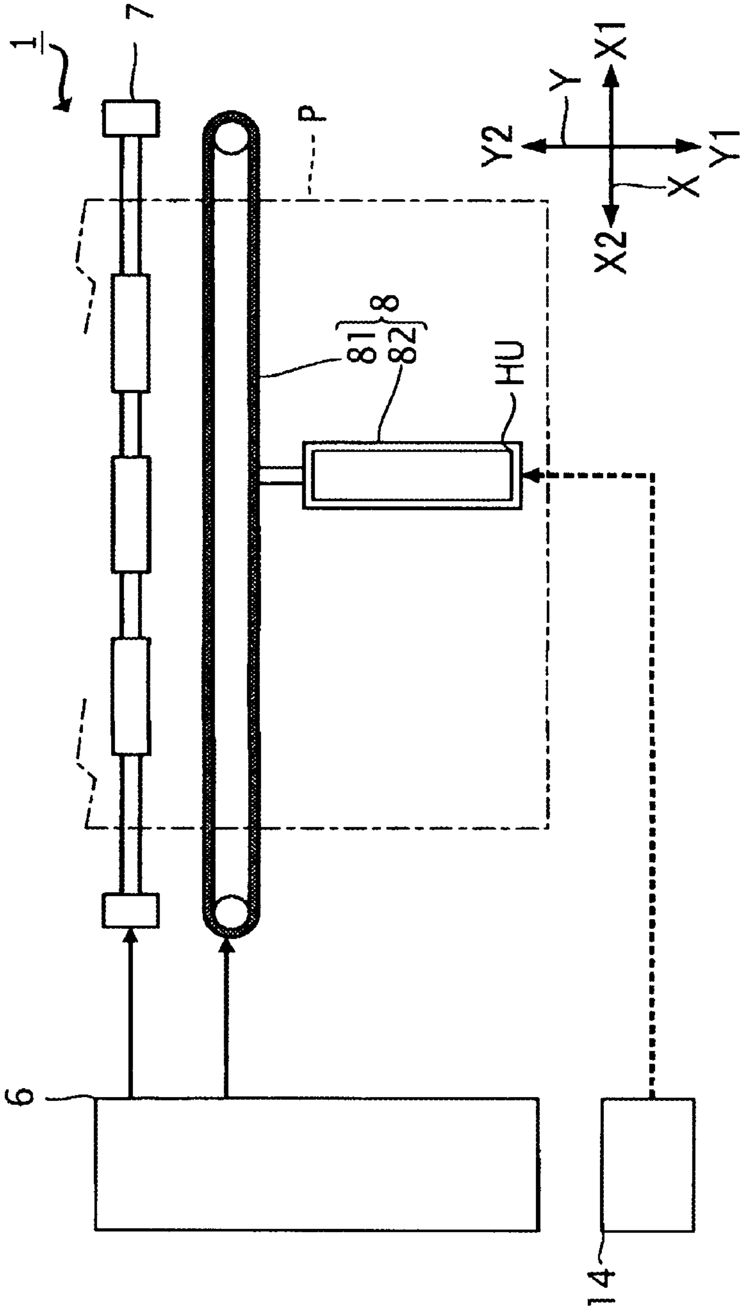
FIG. 2 is a schematic diagram exemplifying the ink jet printer.

The configuration of the ink jet printer 1 according to the present embodiment is described with reference to FIGS. 1 and 2. FIG. 1 is a functional block diagram illustrating an example of the configuration of the ink jet printer 1 according to the present embodiment. FIG. 2 is a schematic diagram exemplifying the ink jet printer 1.

Print data Img indicating an image to be formed by the ink jet printer 1 and information indicating the number of sheets on which the image is to be formed by the ink jet printer 1 are supplied to the ink jet printer 1 from a host computer such as a personal computer or a digital camera. The ink jet printer 1 performs a printing process of forming, on the recording sheet P, the image indicated by the print data Img supplied from the host computer.

As exemplified in FIG. 1, the ink jet printer 1 includes a liquid ejecting head HU including ejecting units D that eject the ink, a controller 6 that controls an operation of each unit of the ink jet printer 1, a drive signal generating circuit 2 that generates a drive signal Com to drive the ejecting units D, a constant potential signal generating circuit 3 that generates a constant potential signal Vbs to maintain a constant potential, a storage unit 5 that stores a control program of the ink jet printer 1 and other information, a generating circuit 9 that generates an ejection information item Stt indicating an ejection characteristic of each of the ejecting units D, a transport mechanism 7 that transports the recording sheet P, and a moving mechanism 8 that moves the liquid ejecting head HU. The ejection characteristic is either one or both of an amount of ink to be ejected and the ejection speed at which the ink is ejected. The potential maintained by the constant potential signal Vbs is a bias potential.

In the present embodiment, the liquid ejecting head HU includes a recording head HD, a switching circuit 10, and a detecting circuit 20. The recording head HD includes the number M of ejecting units D. In the present embodiment, M is an integer of 2 or greater. However, M may be 1.

In the following description, in order to distinguish the number M of ejecting units D included in the recording head HD, the ejecting units D may be referred to as the first stage, the second stage, . . . , and the M-th stage. In addition, an ejecting unit D at an m-th stage may be referred to as an ejecting unit D[m]. The variable m is an integer of 1 or greater and M or less. In addition, when a constituent element, a signal, and the like of the ink jet printer 1 correspond to the m-th stage of the ejecting unit D[m], reference signs indicating the constituent element, the signal, and the like may be represented together with a suffix [m] indicating that the constituent element, the signal, and the like correspond to the m-th stage.

The switching circuit 10 switches whether a drive signal Com output from the drive signal generating circuit 2 is supplied to each of the ejecting units D. In addition, the switching circuit 10 switches whether each of the ejecting units D is electrically coupled to the detecting circuit 20.

The detecting circuit 20 generates, based on a detection signal Vout[m] detected from the ejecting unit D[m] driven by the drive signal Com, a residual vibration signal NES[m] indicating a vibration that remains in the ejecting unit D[m] after the ejecting unit D[m] is driven. The vibration is hereinafter referred to as a "residual vibration".

The generating circuit 9 generates an ejection information item Stt[m] indicating a result of detecting the residual vibration based on the residual vibration signal NES[m]. For example, the ejection information item Stt[m] indicates the amplitude of the residual vibration. An ejecting unit D from which a residual vibration is to be detected by the generating circuit 9 may be referred to as a detection target ejecting unit D-H. In addition, a series of processes that are performed by the ink jet printer 1 and include the generation of an ejection information item Stt[m] by the generating circuit 9 and a preparation process for the generation of the ejection information item Stt[m] by the generating circuit 9 is referred to as an ejection information item generation process.

In the present embodiment, it is assumed that the ink jet printer 1 is a serial printer. Specifically, as illustrated in FIG. 2, the ink jet printer 1 performs the printing process by ejecting the ink from the ejecting units D while transporting the recording sheet P in an auxiliary scan direction and moving the liquid ejecting head HU in a main scan direction. In the present embodiment, as illustrated in FIG. 2, it is assumed that an X1 direction and an X2 direction opposite to the X1 direction are the main scan direction and that a Y1 direction is the auxiliary scan direction. The X1 direction and the X2 direction are collectively referred to as an "X axis direction". The Y1 direction and a Y2 direction opposite to the Y1 direction are collectively referred to as a "Y axis direction". Furthermore, a direction that is perpendicular to the X axis direction and the Y axis direction and toward which the ink is ejected is referred to as a Z1 direction. The Z1 direction and a Z2 direction opposite to the Z1 direction are collectively referred to as a "Z axis direction".

The recording head HD and the ejecting units D included in the recording head HD are described below with reference to FIG. 3.

Figure 3:
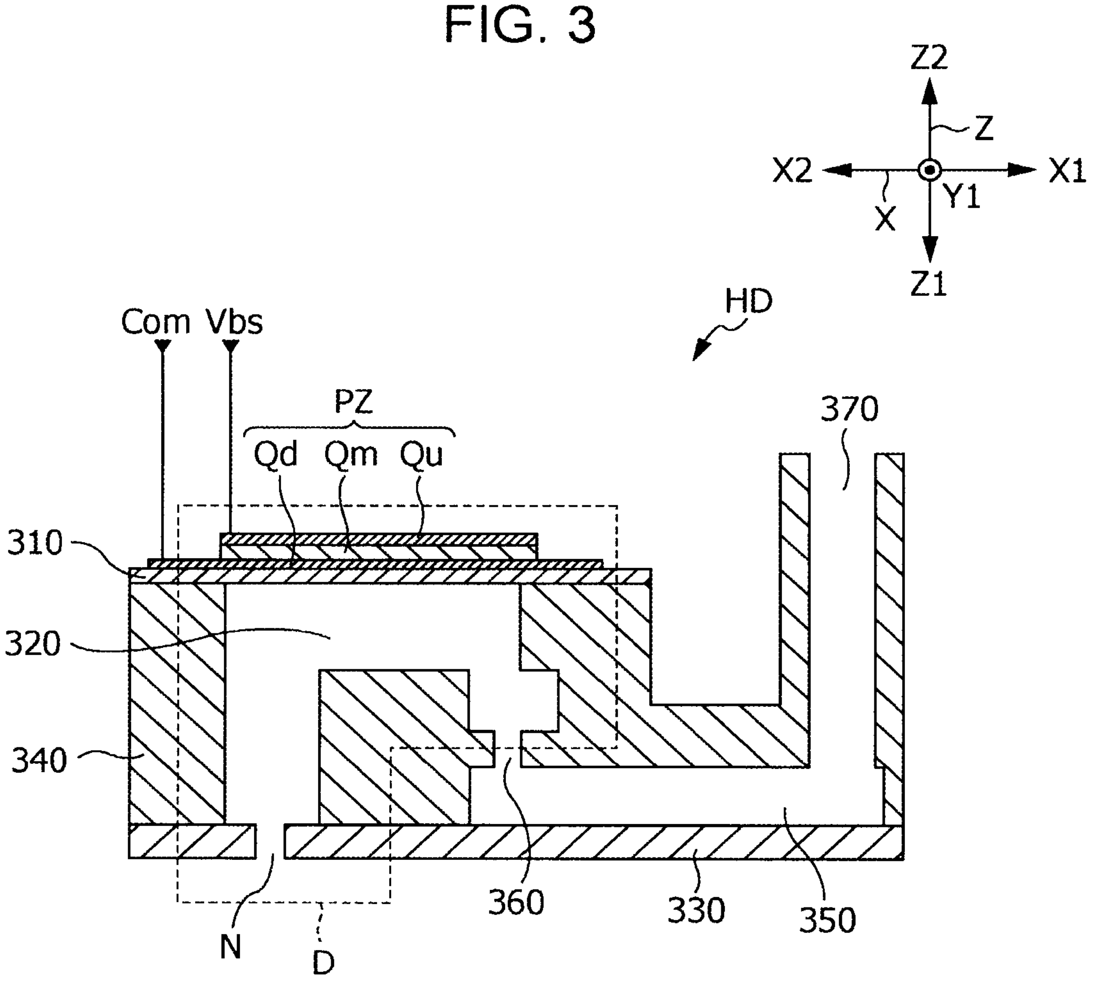
FIG. 3 is a schematic partial cross-sectional view of a recording head, in which the recording head is cut so as to include an ejecting unit.

FIG. 3 is a schematic partial cross-sectional view of the recording head HD, in which the recording head HU is cut so as to include an ejecting unit D.

As illustrated in FIG. 3, each of the ejecting units D includes a piezoelectric element PZ, a pressure chamber 320 in which ink is stored, a nozzle N communicating with the pressure chamber 320, and a vibration plate 310. When the drive signal Com is supplied to the piezoelectric element PZ and the piezoelectric element PZ is drive by the drive signal Com, the ejecting unit D ejects the ink in the pressure chamber 320 from the nozzle N. The pressure chamber 320 is a space defined by a pressure chamber substrate 340, a nozzle plate 330 in which the nozzle N is formed, and the vibration plate 310. The pressure chamber 320 communicates with a reservoir 350 via an ink supply port 360. The reservoir 350 communicates with a liquid container 14 corresponding to the ejecting unit D via an ink receiving port 370.

In the present embodiment, as each of the piezoelectric elements PZ, a unimorph piezoelectric element as illustrated in FIG. 3 is used. The piezoelectric elements PZ are not limited to the unimorph piezoelectric elements and may be bimorph piezoelectric elements, stacked piezoelectric elements, or the like.

The piezoelectric elements PZ include a common electrode Qu, individual electrodes Qd, and piezoelectric bodies Qm disposed between the common electrode Qu and the individual electrodes Qd. The common electrode Qu is disposed on surfaces of the piezoelectric bodies Qm in the Z2 direction. The common electrode Qu is a so-called upper electrode. The individual electrodes Qd are disposed on surfaces of the piezoelectric bodies Qm in the Z1 direction. Each of the individual electrodes Qd is a so-called lower electrode. Each of the piezoelectric elements PZ is a passive element that deforms according to a change in the potential of the drive signal Com. When a voltage is applied between the common electrode Qu and each of the individual electrodes Qd by supplying the constant potential signal Vbs to the common electrode Qu and supplying the drive signal Com to the individual electrode Qd, each of the piezoelectric bodies Qm deforms in a direction perpendicular to the Z axis direction according to the applied voltage.

In the present embodiment, the drive signal Com and the constant potential signal Vbs that are supplied to drive each of the piezoelectric bodies Qm are collectively referred to as a piezoelectric body supply signal. The piezoelectric body supply signal is an example of a "supply signal".

The piezoelectric body Qm is, for example, formed of a crystal film having a perovskite structure and made of a ferroelectric ceramic material exhibiting an electromechanical conversion effect. That is, the piezoelectric body Qm is formed of so-called perovskite crystal. Specifically, as the material of the piezoelectric body Qm, for example, a ferroelectric piezoelectric material such as lead zirconate titanate, or a material obtained by adding metal oxide such as niobium oxide, nickel oxide, or magnesium oxide to a ferroelectric piezoelectric material such as lead zirconate titanate may be used. More specifically, as the material of the piezoelectric body Qm, for example, lead titanate, lead zirconate titanate, lead zirconate, lead lanthanum titanate, lead lanthanum zirconate titanate, lead magnesium niobate zirconate titanate, or the like may be used.

The piezoelectric body Qm can be formed by forming the above-described piezoelectric material by a known film forming technique such as sputtering, and burning the piezoelectric material at a high temperature by a known processing technique such as photolithography.

The vibration plate 310 is disposed on an upper opening portion of the pressure chamber substrate 340. The individual electrode Qd is bonded to the vibration plate 310. Therefore, when the piezoelectric element PZ is driven by the drive signal Com, the piezoelectric element PZ contracts or expands and vibrates in a direction perpendicular to an electric field applied to the piezoelectric element PZ. The vibration plate 310 does not change in dimension and thus bends and vibrates. Then, the volume of the pressure chamber 320 changes due to the vibration of the vibration plate 310 and the ink with which the pressure chamber 320 is filled is ejected from the nozzle N. The ink in the pressure chamber 320 decreases in amount due to the ejection of the ink, and ink is supplied from the reservoir 350 into the pressure chamber 320.

Figure 4:
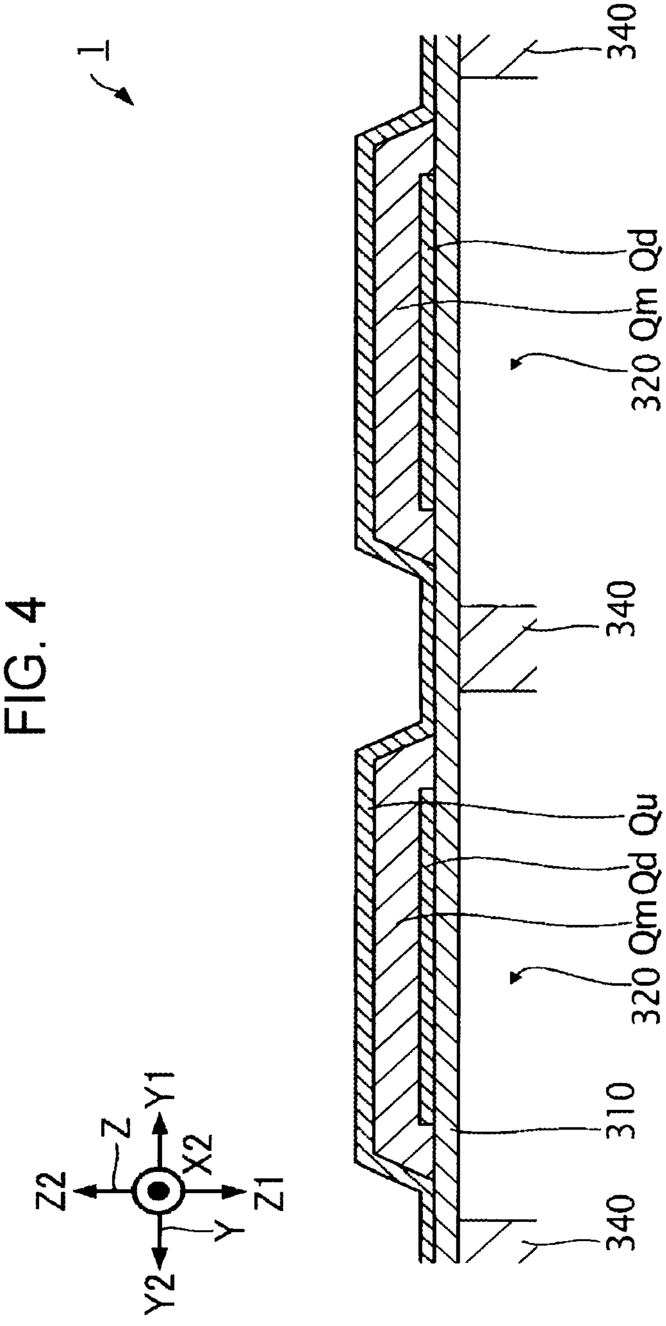
FIG. 4 is a cross-sectional view of a piezoelectric element taken along a Y axis direction.

FIG. 4 is a cross-sectional view of the piezoelectric element PZ taken along the Y axis direction. As illustrated in FIG. 4, the common electrode Qu is disposed so as to cover the plurality of piezoelectric bodies Qm. In other words, the common electrode Qu is commonly provided for the number M of piezoelectric bodies Qm. On the other hand, each of the individual electrodes Qd is provided for a respective one of the number M of the piezoelectric bodies Qm.

Figure 5:
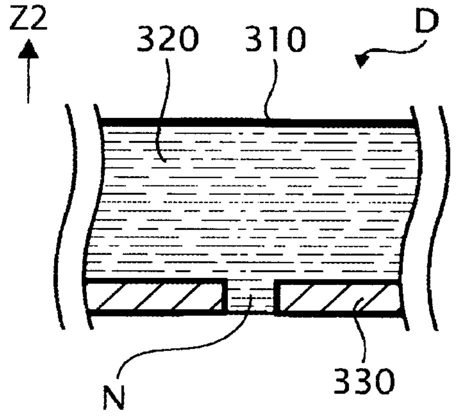
FIG. 5 is an explanatory diagram for explaining an example of an ink ejection operation in each of ejecting units.
Figure 6:
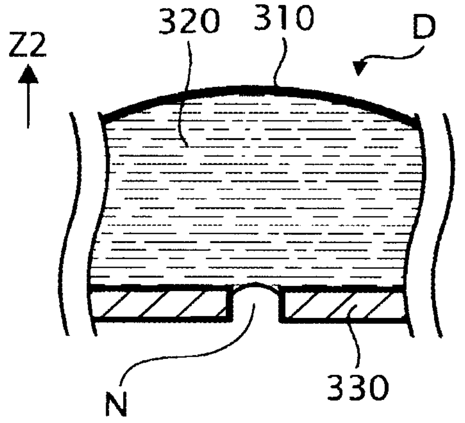
FIG. 6 is an explanatory diagram for explaining the example of the ink ejection operation in each of the ejecting units.
Figure 7:
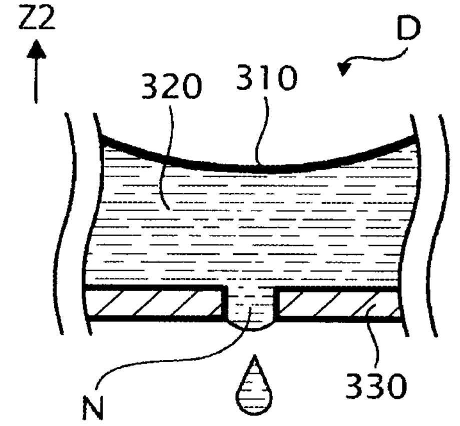
FIG. 7 is an explanatory diagram for explaining the example of the ink ejection operation in each of the ejecting units.

FIGS. 5 to 7 are explanatory diagrams for explaining an example of an ink ejection operation in each of the ejecting units D. As exemplified in FIG. 6, the controller 6 changes the potential of the drive signal Com to be supplied to the piezoelectric element PZ included in the ejecting unit D so as to cause a distortion in the piezoelectric element PZ such that the piezoelectric element PZ deforms toward the Z2 direction and to bend the vibration plate 310 of the ejecting unit D toward the Z2 direction. Therefore, the volume of the pressure chamber 320 of the ejecting unit D increases as exemplified in FIG. 6, as compared with a state exemplified in FIG. 5.

Next, the controller 6 changes the potential indicated by the drive signal Com to cause a distortion in the piezoelectric element PZ such that the piezoelectric element PZ deforms toward the Z1 direction and to bend the vibration plate 310 of the ejecting unit D toward the Z1 direction. Therefore, as exemplified in FIG. 7, the volume of the pressure chamber 320 rapidly decreases and a part of the ink with which the pressure chamber 320 is filled is ejected as an ink drop from the nozzle N communicating with the pressure chamber 320. After the piezoelectric element PZ and the vibration plate 310 are driven by the drive signal Com to deform in the Z axis direction, a residual vibration occurs in the ejecting unit D including the vibration plate 310.

Returning to FIGS. 1 and 2, the transport mechanism 7 transports the recording sheet P toward the Y1 direction. Specifically, the transport mechanism 7 includes a transport roller that is rotated around a rotation axis parallel to the X axis direction, and a motor that rotates the transport roller under control by the controller 6. The transport roller and the motor are not illustrated in the drawings.

The moving mechanism 8 causes the liquid ejecting head HU to reciprocate along the X axis under control by the controller 6. As exemplified in FIG. 2, the moving mechanism 8 includes a substantially box-shaped transport body 82 storing the liquid ejecting head HU, and an endless belt 81 to which the transport body 82 is fixed.

The storage unit 5 includes a volatile memory such as a RAM, and a nonvolatile memory such as a ROM, an EEPROM, or a PROM. The storage unit 5 stores the print data Img supplied from the host computer and various types of information such as the control program of the ink jet printer 1. RAM is an abbreviation for Random-Access Memory. ROM is an abbreviation for Read-Only Memory. EEPROM is an abbreviation for Electrically Erasable Programmable Read-Only Memory. PROM is an abbreviation for Programmable ROM.

The controller 6 includes a CPU. CPU is an abbreviation for Central Processing Unit. However, the controller 6 may include a programmable logic device such as an FPGA instead of the CPU. FPGA is an abbreviation for Field Programmable Gate Array.

When the CPU included in the controller 6 operates in accordance with the control program stored in the storage unit 5, the ink jet printer 1 performs the printing process.

The controller 6 generates a print signal SI to control the liquid ejecting head HU, a waveform specifying signal dCom to control the drive signal generating circuit 2, a constant potential specifying signal dVbs to control the constant potential signal generating circuit 3, a signal to control the transport mechanism 7, and a signal to control the moving mechanism 8.

The waveform specifying signal dCom is a digital signal defining a waveform of the drive signal Com. The drive signal Com is an analog signal to drive each of the ejecting units D. The potential indicated by the waveform of the drive signal Com changes over time. The drive signal generating circuit 2 includes a DA conversion circuit and generates the drive signal Com having the waveform defined by the waveform specifying signal dCom. In the present embodiment, it is assumed that the drive signal Com includes a drive signal Com-A and a drive signal Com-B.

In addition, the constant potential specifying signal dVbs is a digital signal defining the potential of the constant potential signal Vbs. The constant potential signal Vbs is a signal to maintain the common electrode Qu commonly provided for the plurality of piezoelectric elements PZ at a constant potential.

In the present embodiment, a correction value ΔVe for correcting the drive signal Com and the constant potential signal Vbs can be set in the waveform specifying signal dCom and the constant potential specifying signal dVbs. The correction value ΔVe is preferably a real number of 0 or less.

The print signal SI is a digital signal to specify the type of an operation of each of the ejecting units D. Specifically, the print signal SI specifies the type of the operation of each of the ejecting units D by specifying whether the drive signal Com is supplied to each of the ejecting units D. In this case, specifying the type of the operation of each of the ejecting units D means specifying whether or not to drive each of the ejecting units D or specifying whether or not to eject the ink from each of the ejecting units D when the ejecting unit D is driven.

When the printing process is to be performed, the controller 6 causes the print data Img supplied from the host computer to be stored in the storage unit 5. Next, the controller 6 generates, based on various data such as the print data Img stored in the storage unit 5, various control signals such as the print signal SI, the waveform specifying signal dCom, the constant potential specifying signal dVbs, the signal to control the transport mechanism 7, and the signal to control the moving mechanism 8. Then, the controller 6 controls the liquid ejecting head HU based on the various control signals and the various data stored in the storage unit 5 so as to drive the ejecting units D, while controlling the transport mechanism 7 and the moving mechanism 8 to change a relative position of the recording sheet P to the liquid ejecting head HU. By performing the control, the controller 6 controls whether to eject the ink from the ejecting units D, amounts of the ink to be ejected, timings of ejecting the ink, and the like, and controls the execution of the printing process of forming the image corresponding to the print data Img on the recording sheet P.

In the ejection information item generation process, the ink jet printer 1 performs a series of the following first to fifth processes. In the first process, the controller 6 selects a detection target ejecting unit D-H from among the number M of ejecting units D included in the liquid ejecting head HU. In the second process, the controller 6 drives the detection target ejecting unit D-H to cause a residual vibration in the detection target ejecting unit D-H. In the third process, the detecting circuit 20 generates a residual vibration signal NES based on a detection signal Vout detected from the detection target ejecting unit D-H. In the fourth process, the generating circuit 9 generates an ejection information item Stt based on the residual vibration signal NES. In the fifth process, the controller 6 causes the ejection information item Stt to be stored in the storage unit 5.

The controller 6 reads a program stored in the storage unit 5 and executes the read program, thereby functioning as an acquirer 61 and a determiner 62. The acquirer 61 and the determiner 62 are described below.

1.2. Configuration of Liquid Ejecting Head HU

The configuration of the liquid ejecting head HU is described below with reference to FIG. 8.

Figure 8:
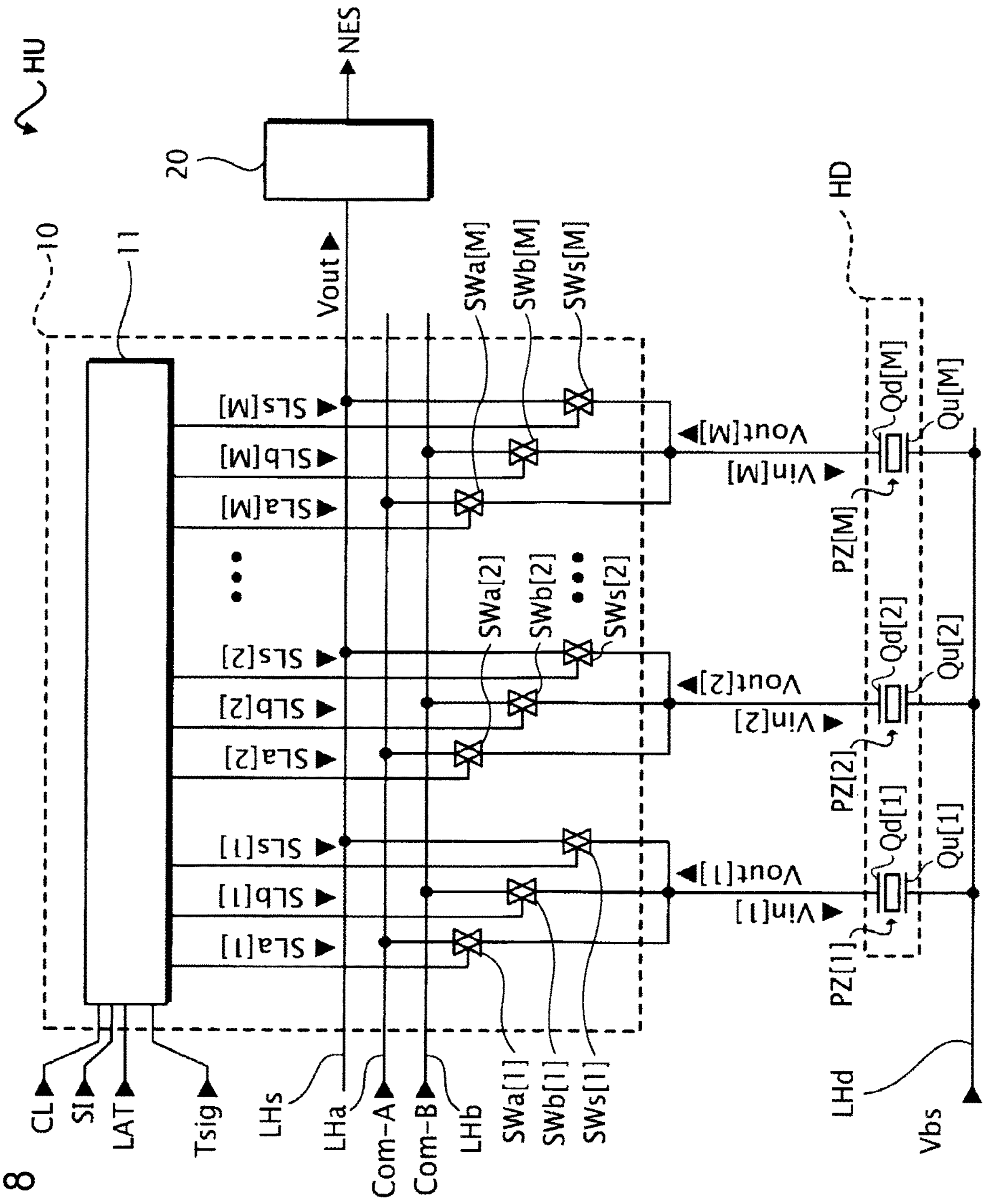
FIG. 8 is a block diagram illustrating an example of a configuration of a liquid ejecting head.

FIG. 8 is a block diagram illustrating an example of the configuration of the liquid ejecting head HU. As described above, the liquid ejecting head HU includes the recording head HD, the switching circuit 10, and the detecting circuit 20. In addition, the liquid ejecting head HU includes an internal wiring LHa to which the drive signal Com-A is supplied from the drive signal generating circuit 2, an internal wiring LHb to which the drive signal Com-B is supplied from the drive signal generating circuit 2, an internal wiring LHs through which detection signals Vout detected from the ejecting units D are supplied to the detecting circuit 20, and an internal wiring LHd to which the constant potential signal Vbs is supplied from the constant potential signal generating circuit 3. The internal wiring LHd is electrically coupled to the common electrode Qu.

As illustrated in FIG. 8, the switching circuit 10 includes a number M of switches SWa[1] to SWa[M], a number M of switches SWb[1] to SWb[M], a number M of switches SWs[1] to SWs[M], and a coupling state specifying circuit 11 that specifies a coupling state of each of the switches. As each of the switches, for example, a transmission gate can be used.

The coupling state specifying circuit 11 generates coupling state specifying signals SLa[1] to SLa[M] specifying ON or OFF of each of the switches SWa[1] to SWa[M], coupling state specifying signals SLb[1] to SLb[M] specifying ON or OFF of each of the switches SWb[1] to SWb[M], and coupling state specifying signals SLs[1] to SLs[M] specifying ON or OFF of each of the switches SWs[1] to SWs[M] based on one or more of the print signal SI, the latch signal LAT, the change signal CH, and a time period specifying signal Tsig supplied from the controller 6.

The switch SWa[m] switches, according to the coupling state specifying signal SLa[m], whether or not the internal wiring LHa is conductive with the individual electrode Qd[m] of the piezoelectric element PZ[m] included in the ejecting unit D[m]. For example, the switch SWa[m] is ON when the coupling state specifying signal SLa[m] is at a high level. For example, the switch SWa[m] is OFF when the coupling state specifying signal SLa[m] is at a low level.

The switch SWb[m] switches, according to the coupling state specifying signal SLb[m], whether or not the internal wiring LHb is conductive with the individual electrode Qd[m] of the piezoelectric element PZ[m] included in the ejecting unit D[m]. For example, the switch SWb[m] is ON when the coupling state specifying signal SLb[m] is at a high level. For example, the switch SWb[m] is OFF when the coupling state specifying signal SLb[m] is at a low level.

The switch SWs[m] switches, according to the coupling state specifying signal SLs[m], whether or not the internal wiring LHs is conductive with the individual electrode Qd[m] of the piezoelectric element PZ[m] included in the ejecting unit D[m]. For example, the switch SWs[m] is ON when the coupling state specifying signal SLs[m] is at a high level. For example, the switch SWs[m] is OFF when the coupling state specifying signal SLs[m] is at a low level.

The detection signal Vout[m] output from the piezoelectric element PZ[m] of the ejecting unit D[m] driven as the detection target ejecting unit D-H is supplied to the detecting circuit 20 through the internal wiring LHs. Then, the detecting circuit 20 generates a residual vibration signal NES based on the detection signal Vout[m].

1.3. Operation of Liquid Ejecting Head HU

The operation of the liquid ejecting head HU is described below with reference to FIGS. 9 and 10.

In the present embodiment, an operation period of the ink jet printer 1 includes one or multiple unit time periods Tu. It is assumed that the ink jet printer 1 according to the present embodiment drives each of the ejecting units D in the printing process or detects the driving and residual vibration of the detection target ejecting unit D-H in the preparation process for the ejection information item generation process in each unit time period Tu. However, the present disclosure is not limited thereto. In each unit time period Tu, the ink jet printer 1 according to the present embodiment may be able to drive each of the ejecting units D in the printing process and detect the driving and residual vibration of the detection target ejecting unit D-H in the preparation process for the ejection information item generation process.

Generally, the ink jet printer 1 forms the image indicated by the print data Img by repeatedly performing the printing process to eject the ink from each of the ejecting units D one or multiple times over a plurality of continuous or intermittent unit time periods Tu. In two continuous or intermittent unit time periods Tu, the ink jet printer 1 according to the present embodiment performs the preparation process for the ejection information item generation process twice and performs the ejection information item generation process on a detection target ejecting unit D-H that is any ejecting unit D[m1] among the number M of ejecting units D. m1 is an integer of 1 or greater and M or less.

Figure 9:
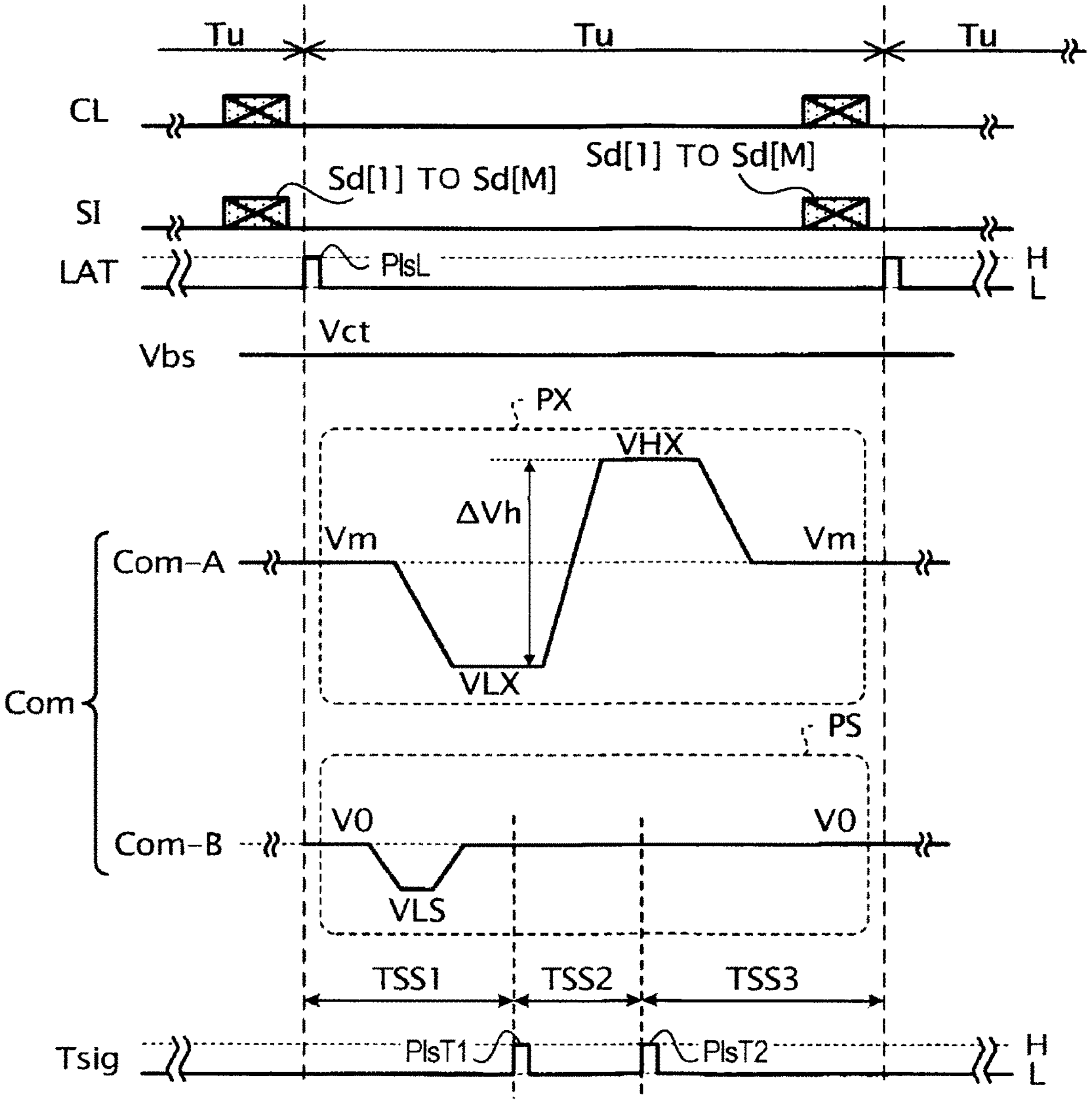
FIG. 9 is a diagram illustrating a timing chart for explaining an operation of the ink jet printer in a unit time period.

FIG. 9 is a timing chart for explaining an operation of the ink jet printer 1 in a unit time period Tu.

As illustrated in FIG. 9, the controller 6 outputs a latch signal LAT having pulses PIsL. The controller 6 defines the unit time period Tu as a time period from the rising edge of the pulse PIsL to the rising edge of the next pulse PIsL.

The print signal SI includes individual specifying signals Sd[1] to Sd[M] specifying driving states of the ejecting units D[1] to D[M] in each unit time period Tu. When at least one of the printing process and the ejection information item generation process is to be performed in the unit time period Tu, the controller 6 supplies the print signal SI including the individual specifying signals Sd[1] to Sd[M] to the coupling state specifying circuit 11 in synchronization with the clock signal CL before the start of the unit time period Tu, as illustrated in FIG. 8. In this case, the coupling state specifying circuit 11 generates coupling state specifying signals Sla[m], SLb[m], and SLs[m] based on the individual specifying signal Sd[m] in the unit time period Tu.

The individual specifying signal Sd[m] according to the present embodiment specifies any one of three driving states, ejection of ink, non-ejection of ink, and driving as a detection target in the ejection information item generation process for the ejecting unit D[m] in each unit time period Tu.

As illustrated in FIG. 9, the drive signal generating circuit 2 outputs the drive signal Com-A having a dot waveform PX in the unit time period Tu. The dot waveform PX has a waveform part for a time period for which an intermediate potential Vm is maintained, a waveform part for a time period for which the potential decreases from the intermediate potential Vm to the lowest potential VLX, a waveform part for a time period for which the lowest potential VLX is maintained, a waveform part for a time period for which the potential increases the lowest potential VLX to the highest potential VLX, a waveform part for a time period for which the highest potential VHX is maintained, a waveform part for a time period for which the potential decreases from the highest potential VHX to the intermediate potential Vm, and a waveform part for a time period for which the intermediate potential Vm is maintained. The amplitude of the potential of the dot waveform PX is a potential difference ΔVh between the lowest potential VLX and the highest potential VHX. In the present embodiment, the value of the intermediate potential Vm, the value of the lowest potential VLX, and the value of the highest potential VHX are changed based on a correction value ΔVe described below.

When the individual specifying signal Sd[m] specifies ejection of ink for the ejecting unit D[m], the coupling state specifying circuit 11 sets the coupling state specifying signal SLa[m] to a high level for the unit time period Tu and sets the coupling state specifying signals SLb[m] and SLs[m] to a low level for the unit time period Tu. Therefore, the ejecting unit D[m] ejects the ink in the unit time period Tu to form a dot on the recording sheet P.

In addition, when the individual specifying signal Sd[m] specifies non-ejection of ink for the ejecting unit D[m], the coupling state specifying circuit 11 sets the coupling state specifying signals SLa[m], SLb[m], and SLs[m] to a low level for the unit time period Tu. In this case, the ejecting unit D[m] does not eject the ink and does not form a dot on the recording sheet P for the unit time period Tu.

As illustrated in FIG. 9, the drive signal generating circuit 2 outputs the drive signal Com-B having an inspection waveform PS in the unit time period Tu. The inspection waveform PS includes a waveform part for a time period for which a reference potential V0 is maintained, a waveform part for a time period for which the potential decreases from the reference potential V0 to the lowest potential VLs, a waveform part for a time period for which the lowest potential VLS is maintained, a waveform part for a time period for which the potential increases from the lowest potential VLS to the reference potential V0, and a waveform part for a time period for which the reference potential V0 is maintained.

In addition, the controller 6 outputs the time period specifying signal Tsig having a pulse PIsT1 and a pulse PIsT2. Therefore, the controller 6 divides the unit time period Tu into a control period TSS1 from the start of the pulse PIsL to the start of the pulse PIsT1, a control period TSS2 from the start of the pulse PIsT1 to the start of the pulse PIsT2, and a control period TSS3 from the start of the pulse PIsT2 to the start of the next pulse PIsL.

When the individual specifying signal Sd[m] specifies the ejecting unit D[m] as a detection target ejecting unit D-H, the coupling state specifying circuit 11 sets the coupling state specifying signal SLa[m] to a low level for the unit time period Tu, sets the coupling state specifying signal SLb[m] to a high level for the control periods TSS1 and TSS3 and to a low level for the control period TSS2, and sets the coupling state specifying signal SLs[m] to a low level for the control periods TSS1 and TSS3 and to a high level for the control period TSS2.

In this case, the detection target ejecting unit D-H is driven by the drive signal Com-B having the inspection waveform PS in the control period TSS1. Specifically, the piezoelectric element PZ included in the detection target ejecting unit D-H is deformed by the drive signal Com-B having the inspection waveform PS in the control period TSS1. As a result, a vibration occurs in the detection target ejecting unit D-H and remains even in the control period TSS2. In the control period TSS2, the common electrode Qu within the piezoelectric element PZ of the detection target ejecting unit D-H is at a potential that changes according to the residual vibration in the detection target ejecting unit D-H. In other words, in the control period TSS2, the common electrode Qu within the piezoelectric element PZ of the detection target ejecting unit D-H is at the potential according to electromotive force of the piezoelectric element PZ caused by the residual vibration in the detection target ejecting unit D-H. In the control period TSS2, the potential of the common electrode Qu can be detected as a detection signal Vout.

When the detection target ejecting unit D-H is driven by the inspection waveform PS to generate a residual vibration, the detection target ejecting unit D-H may eject the ink or may not eject the ink. In the present embodiment, it is assumed that the inspection waveform PS does not cause the ink to be ejected.

As illustrated in FIG. 9, the constant potential signal generating circuit 3 outputs the constant potential signal Vbs. The constant potential signal Vbs maintains a potential Vct. In the present embodiment, the value of the potential Vct is changed based on a correction value ΔVe.

FIG. 10 is an explanatory diagram for explaining the generation of the coupling state specifying signals SLa[m], SLb[m], and SLs[m]. The coupling state specifying circuit 11 decodes the individual specifying signal Sd[m] to generate the coupling state specifying signals SLa[m], SLb[m], and SLs[m] in accordance with FIG. 10. As illustrated in FIG. 10, the individual specifying signal Sd[m] according to the present embodiment indicates any one of a value (1, 0) specifying ejection of ink, a value (0, 0) specifying non-ejection of ink, and a value (1, 1) specifying driving as the detection target ejecting unit D-H. When the individual specifying signal Sd[m] indicates (1, 0), the coupling state specifying circuit 11 sets the coupling state specifying signal SLa[m] to a high level for the unit time period Tu. When the individual specifying signal Sd[m] indicates (1, 1), the coupling state specifying circuit 11 sets the coupling state specifying signal SLb[m] to a high level for the control periods TSS1 and TSS3 and sets the coupling state specifying signal SLs[m] to a high level for the control period TSS2. When the individual specifying signal Sd[m] indicates the other value (0, 0), the coupling state specifying circuit 11 sets each of the coupling state specifying signals SLa[m], SLb[m], and SLs[m] to a low level for the unit time period Tu.

1.4. Regarding Correction Value ΔVe

In the present embodiment, the controller 6 sets correction values ΔVe to be used to instruct the drive signal generating circuit 2 and the constant potential signal generating circuit 3 to the same value. The drive voltage applied to the piezoelectric body Qm is a potential difference between the potential applied to the individual electrode Qd and the potential applied to the common electrode Qu. The correction value ΔVe shifts the drive voltage to be applied to the piezoelectric body Qm to a lower value. In other words, while the magnitude of the drive voltage to be applied to the piezoelectric body Qm does not change, the potential to be applied to the individual electrode Qd and the potential to be applied to the common electrode Qu are shifted to lower values by the correction value ΔVe. Specific examples of the correction value ΔVe are described below using specific examples of the waveform specifying signal dCom and the constant potential specifying signal dVbs.

FIG. 11 is a diagram illustrating an example of the correction value ΔVe corresponding to the waveform specifying signal dCom. FIG. 11 illustrates a value dC0, a value dC3, and a value dC5 among a plurality of values that the waveform specifying signal dCom received by the drive signal generating circuit 2 can take. When the waveform specifying signal dCom indicates the value dC0, the drive signal generating circuit 2 generates a drive signal Com corresponding to a correction value Δ of 0 [V]. [V] means a volt that is a unit of potential and a unit of voltage, which is a potential difference. FIG. 11 illustrates an example of each of potentials that a drive signal Com-A corresponding to the correction value ΔVe of 0 [V] can take. FIG. 11 illustrates a case where the intermediate potential Vm is 10 [V], the lowest voltage VLX is −5 [V], and the highest potential VHX is 25 [V] in the drive signal Com-A corresponding to the correction value ΔVe of 0 [V].

When the waveform specifying signal dCom indicates the value dC3, the drive signal generating circuit 2 generates a drive signal Com corresponding to a correction value ΔVe of −3 [V]. FIG. 11 illustrates an example of potentials that the drive signal Com-A corresponding to the correction value ΔVe of −3 [V] can take. As illustrated in FIG. 11, each of the potentials that the drive signal Com-A corresponding to the correction value ΔVe of −3 [V] can take is lower by −3 [V] than each of the potentials that the drive signal Com-A corresponding to the correction value ΔVe of 0 [V] can take. Specifically, in the drive signal Com-A corresponding to the correction value ΔVe of −3 [V], the intermediate potential Vm is 7 [V], the lowest potential VLX is −8 [V], and the highest potential VHX is 22 [V]. Although not illustrated in FIG. 11, potentials that the drive signal Com-B corresponding to the correction value ΔVe of −3 [V] can take, for example, the reference potential V0 and the lowest potential VLS, are lower by −3 [V] than potentials that the drive signal Com-B corresponding to the correction value ΔVe of 0 [V] can take.

When the waveform specifying signal dCom indicates the value dC5, the drive signal generating circuit 2 generates a drive signal Com corresponding to a correction value ΔVe of −5 [V]. FIG. 11 illustrates an example of potentials that the drive signal Com-A corresponding to the correction value ΔVe of −5 [V] can take. As illustrated in FIG. 11, each of the potentials that the drive signal Com-A corresponding to the correction value ΔVe of −5 [V] can take is lower by −5 [V] than each of the potentials that the drive signal Com-A corresponding to the correction value ΔVe of 0 [V] can take. Specifically, in the drive signal Com-A corresponding to the correction value ΔVe of −5 [V], the intermediate potential Vm is 5 [V], the lowest potential VLX is −10 [V], and the highest potential VHX is 20 [V]. Although not illustrated in FIG. 11, potentials that the drive signal Com-B corresponding to the correction value ΔVe of −5 [V] can take, for example, the reference potential V0 and the lowest potential VLS, are lower by −5 [V] than the potentials that the drive signal Com-B corresponding to the correction value ΔVe of 0 [V] can take.

FIG. 12 is a diagram illustrating an example of the correction value ΔVe corresponding to the constant potential specifying signal dVbs. FIG. 12 illustrates a value dV0, a value dV3, and a value dV5 among a plurality of values that the waveform specifying signal dCom received by the constant potential signal generating circuit 3 can take. When the constant potential specifying signal dVbs indicates the value dV1, the constant potential signal generating circuit 3 generates a constant potential signal Vbs corresponding to a correction value ΔVe of 0 [V]. FIG. 12 illustrates a case where the potential Vct of the constant potential signal Vbs corresponding to the correction value ΔVe of 0 [V] is −5 [V].

When the constant potential specifying signal dVbs indicates the value dV3, the constant potential signal generating circuit 3 generates a constant potential signal Vbs corresponding to a correction value ΔVe of −3 [V]. As illustrated in FIG. 12, the potential Vct of the constant potential signal Vbs corresponding to the correction value ΔVe of −3 [V] is −8 [V], which is lower by −3 [V] than the potential Vct of the constant potential signal Vbs corresponding to the correction value ΔVe of 0 [V].

When the constant potential specifying signal dVbs indicates the value dV5, the constant potential signal generating circuit 3 generates a constant potential signal Vbs corresponding to a correction value ΔVe of −5 [V]. As illustrated in FIG. 12, the potential Vct of the constant potential signal Vbs corresponding to the correction value ΔVe of −5 [V] is −10 [V], which is lower by −5[V] than the potential Vct of the constant potential signal Vbs corresponding to the correction value ΔVe of 0 [V].

Figure 13:
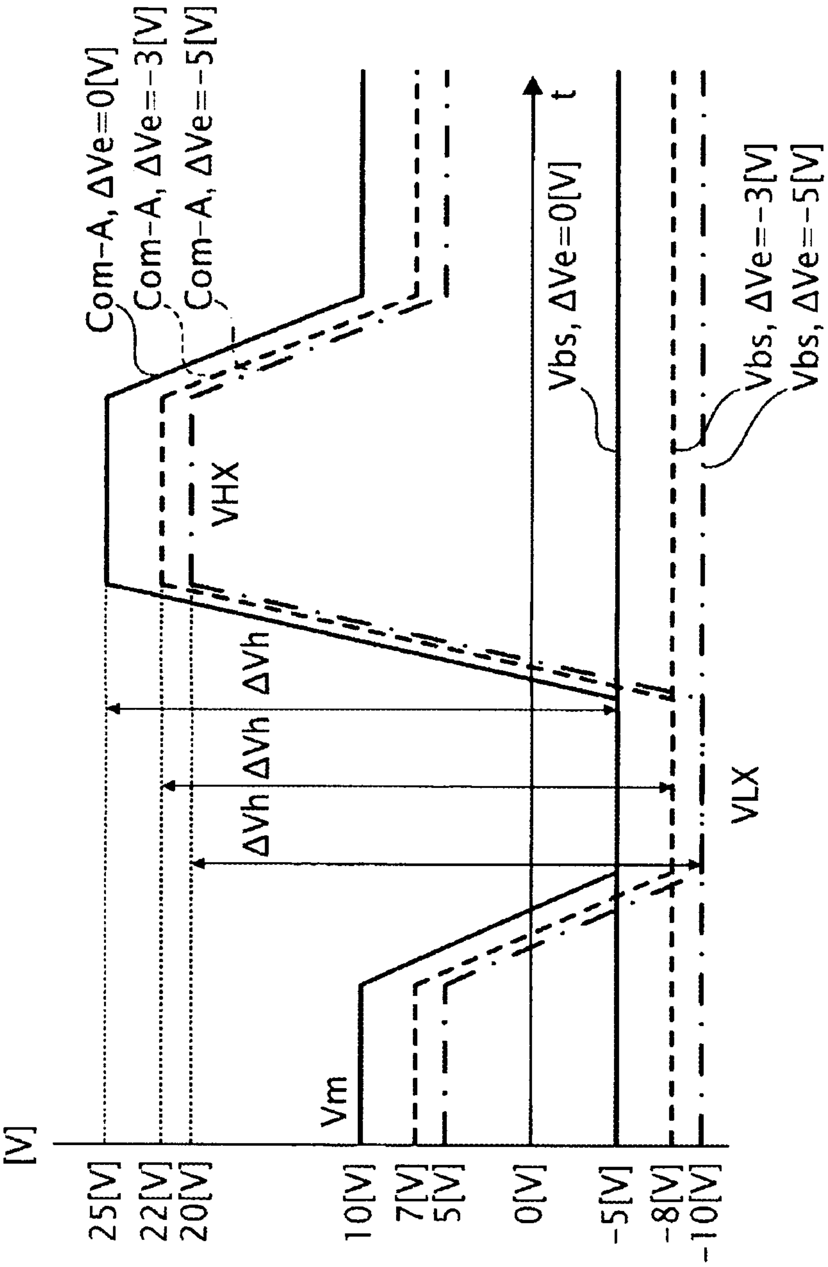
FIG. 13 is a diagram for explaining a drive voltage applied to a piezoelectric body.
Figure 14:
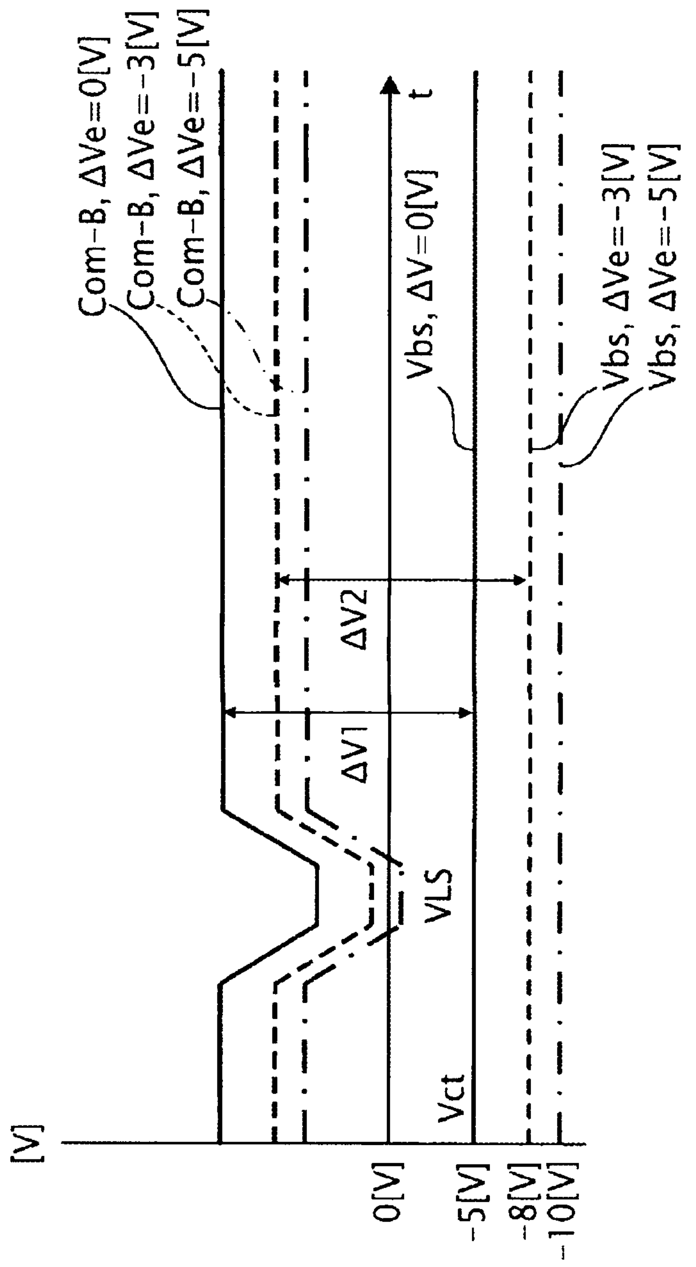
FIG. 14 is a diagram for explaining a drive voltage applied to the piezoelectric body.

FIGS. 13 and 14 are diagrams for explaining the drive voltage applied to the piezoelectric body Qm. FIG. 13 illustrates the drive signal Com-A and the constant potential signal Vbs when the correction value ΔVe is 0 [V], the drive signal Com-A and the constant potential signal Vbs when the correction value ΔVe is −3 [V], and the drive signal Com-A and the constant potential signal Vbs when the correction value ΔVe is −5 [V]. FIG. 14 illustrates the drive signal Com-B and the constant potential signal Vbs when the correction value ΔVe is 0 [V], the drive signal Com-B and the constant potential signal Vbs when the correction value ΔVe is −3 [V], and the drive signal Com-B and the constant potential signal Vbs when the correction value ΔVe is −5 [V].

As illustrated in FIGS. 13 and 14, regardless of what the correction value ΔVe is, the correction value ΔVe does not affect the magnitude of the drive voltage applied to the piezoelectric body Qm. Specifically, for example, the drive voltage when the correction value ΔVe is 0 [V] and the drive signal Com-A is at the highest potential VHX is ΔVh and is 30 [V], which is obtained by subtracting the potential of −5 [V] of the constant potential signal Vbs from the potential of 25 [V] of the drive signal Com-A in the example illustrated in FIG. 13. The drive voltage when the correction value ΔVe is −3 [V] and the drive signal VCom-A is at the highest potential VHX is also ΔVh and is 30 [V] in the example illustrated in FIG. 13. The drive voltage when the correction value ΔVe is −5 [V] and the drive signal Com-A is at the highest potential VHX is also ΔVh and is 30 [V] in the example illustrated in FIG. 13. Although the example in which the drive signal Com-A is supplied to the individual electrode Qd is described above, the drive signal Com-B is supplied to the individual electrode Qd.

As illustrated in FIG. 14, a potential difference ΔV1 obtained by subtracting the potential of the constant potential signal Vbs from the highest potential of the drive signal Com-B when the correction value ΔVe is 0 [V] is substantially equal to a potential difference ΔV2 obtained by subtracting the potential of the constant potential signal Vbs from the highest potential of the drive signal Com-B when the correction value ΔVe is −3 [V]. The fact that the potential differences are substantially equal indicates that the potential differences are completely equal to each other and that the potential differences can be regarded as equal to each other when a manufacturing error is taken into consideration.

1.5. Regarding Characteristics of Piezoelectric Body Qm

It is known that deformation characteristics and polarization characteristics of the piezoelectric body Qm change over time. Changes in the deformation characteristics and polarization characteristics of the piezoelectric body Qm are described with reference to FIGS. 15 and 16.

Figure 15:
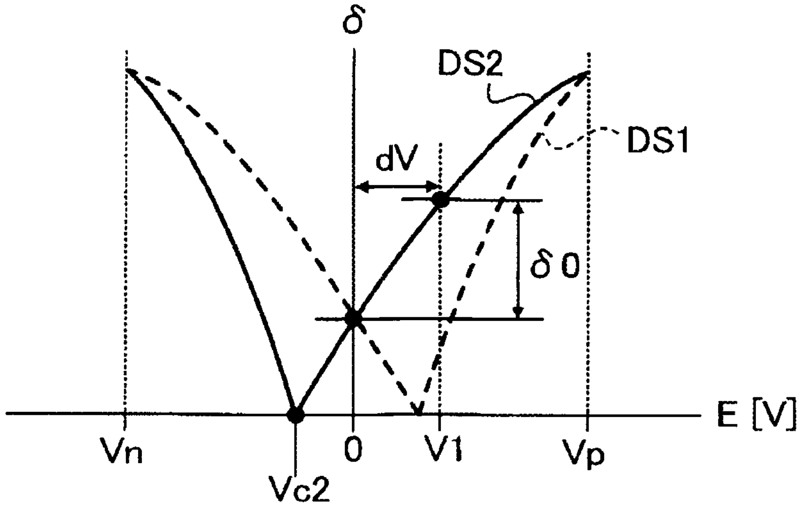
FIG. 15 is a diagram for explaining deformation characteristics of the piezoelectric body.

FIG. 15 is a diagram for explaining a change in the deformation characteristics of the piezoelectric body Qm. In a graph illustrated in FIG. 15, the horizontal axis indicates a potential E and the vertical axis indicates a deformation δ of the piezoelectric body Qm. Characteristics DS2 of the piezoelectric body Qm indicate that the potential is changed from a potential Vp corresponding to a positive saturated polarization point to a potential Vn corresponding to a negative saturated polarization point for the piezoelectric body Qm. In addition, characteristics DS1 of the piezoelectric body Qm indicates that the potential is changed from the potential Vn to the potential Vp for the piezoelectric body Qm. In the liquid ejecting apparatus according to the present embodiment, since a potential that reaches the negative saturated polarization point is not applied, only the characteristics DS2 of the piezoelectric body Qm contribute to the actual ejection operation. Therefore, in the following description, the characteristics DS1 of the piezoelectric body Qm will not be described unless otherwise specified.

Each of a potential Vc1 of the characteristics DS1 of the piezoelectric body Qm and a potential Vc2 of the characteristics DS2 of the piezoelectric body Qm is called a coercive electric field. The coercive electric field is the magnitude of an external electric field where the polarization is zero. The potential Vc1 is higher than the potential of 0 [V]. The potential Vc2 is lower than the potential of 0 [V]. In the present embodiment, when the liquid ejecting apparatus is used, a potential that is in a range from the potential of 0 [V] to the potential V1 that corresponds to a potential difference dV between the potential of 0 [V] and the potential V1 is used. Therefore, a deformation 50 can be obtained.

Figure 16:
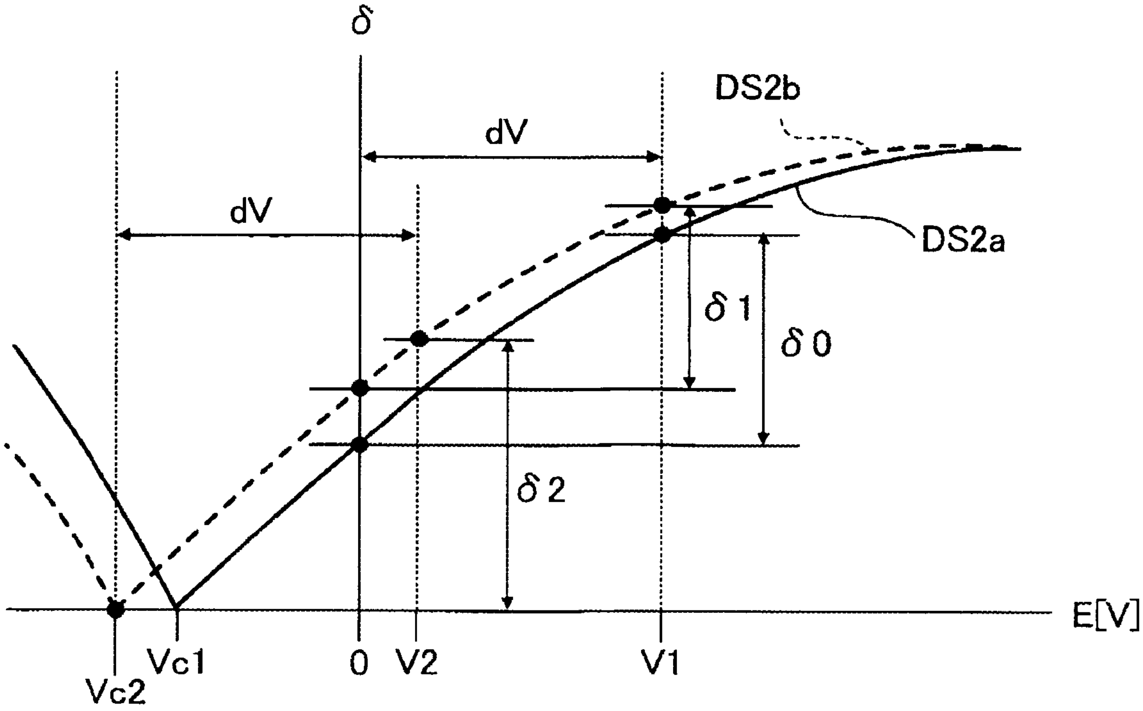
FIG. 16 is a diagram for explaining a change in the deformation characteristics of the piezoelectric body.

FIG. 16 is a diagram for explaining a change in the characteristics DS2 of the piezoelectric body Qm before and after a change of the piezoelectric body Qm over time. In FIG. 16, DS2a corresponds to the characteristics DS2 of the piezoelectric body Qm before the change of the piezoelectric body Qm over time and indicates the same characteristics as illustrated in FIG. 15. In FIG. 16, DS2b corresponds to the characteristics DS2 of the piezoelectric body Qm after the change of the piezoelectric body Qm over time. FIG. 16 illustrates only a necessary region included in the region illustrated in FIG. 15 in order to facilitate understanding. Potentials indicated by the deformation characteristics of the piezoelectric body Qm are shifted to lower potentials. In addition, as is understood from FIG. 16, the deformation of the piezoelectric body Qm with respect to a change in the potential decreases over time. For example, in the characteristics DS2a of the piezoelectric body Qm before the change of the piezoelectric body Qm over time, the deformation of the piezoelectric body Qm is δ0 when the potential is in the range from the potential 0 [V] to the potential V1 that corresponds to the potential difference dV between the potential 0 [V] and the potential V1. However, in the characteristics DS2b of the piezoelectric body Qm after the change of the piezoelectric body Qm over time, the deformation of the piezoelectric body Qm is δ1 when the potential is in the range from the potential of 0 [V] to the potential V1 that corresponds to the potential difference dV between the potential of 0 [V] and the potential V1. The deformation δ1 is smaller than the deformation δ0. That is, the amount of the deformation of the piezoelectric body Qm after the change of the piezoelectric body Qm over time is smaller than the amount of the deformation of the piezoelectric body Qm before the change of the piezoelectric body Qm over time when the same potential is applied. As a result of repeatedly driving the piezoelectric body Qm, a so-called fatigue phenomenon in which the piezoelectric body Qm is partially fixed such that the polarization direction of the piezoelectric body Qm extends along a direction in which the electric field is applied occurs and is considered to be caused by a decrease in the amount of the deformation of the piezoelectric body Qm. Therefore, in the present embodiment, after the change of the piezoelectric body Qm over time, a potential in a range from a potential V2 to the potential Vc2 that corresponds to a potential difference dV between the potential V2 and the potential Vc2 is used. In the characteristics DS2b of the piezoelectric body Qm after the change of the piezoelectric body Qm over time, the deformation of the piezoelectric body Qm is δ2 when the potential is in the range from the potential V2 to the potential Vc2 that corresponds to the potential difference dV between the potential V2 and the potential Vc2. The deformation δ2 is equal to the deformation δ0. Therefore, even after the change of the piezoelectric body Qm over time, the amount of the deformation of the piezoelectric body Qm can be the same and the ejection characteristics can be maintained. The potential difference dV between the potential of 0 [V] and the potential V1 is preferably equal to the potential difference dV between the potential Vc2 and the potential V2, but may be different from the potential difference dV between the potential Vc2 and the potential V2. As illustrated in FIG. 16, the potential V1 is higher than the potential Vc1. The potential V2 is between the potential of 0 [V] and the potential Vc1.

1.6. Operation of Ink Jet Printer 1 According to Present Embodiment

As described above, when the piezoelectric body Qm is repeatedly driven, the amount of the deformation of the piezoelectric body Qm decreases. The decrease in the amount of the deformation of the piezoelectric body Qm results in either one or both of a decrease in the amount of the ink ejected and a decrease in the ejection speed. To stably maintain the ejection characteristics, it is effective to correct the piezoelectric body supply signal. However, a decrease in the amount of the deformation of the piezoelectric body Qm is not necessarily constant with respect to the number of times that the piezoelectric body Qm is driven. When the piezoelectric body Qm is made of lead zirconate titanate, the decrease in the amount of the deformation of the piezoelectric body Qm is considered to be caused by a change in a residual distortion in the piezoelectric body Qm due to the fact that oxygen and lead crystal defects may occur and polarization may occur in crystal defect layers such as a titanium-rich layer, and the common electrode Qu and the individual electrodes Qd to which lead diffuses. Since such crystal defects depend on manufacturing variations such as the sintering temperature and temperature rise of the piezoelectric body Qm and annealing temperatures of the electrodes in various processes, it is difficult to keep the decrease in the amount of the deformation of the piezoelectric body Qm constant. In addition, the residual distortion varies depending on stress applied to the piezoelectric body Qm during the manufacturing process and depends on an environmental temperature during use. A decrease in the amount of the deformation of the piezoelectric body Qm is related to many causes as described above, and thus cannot be identified based on only the number of times that the piezoelectric body Qm is driven and an elapsed time period.

In the first embodiment, the correction value ΔVe for correcting the piezoelectric body supply signal is changed, an ejection information item Stt is acquired, and an appropriate piezoelectric body supply signal is determined based on the ejection information item Stt. A process of determining the piezoelectric body supply signal is referred to as a "piezoelectric body supply signal determination process". The piezoelectric body supply signal determination process is repeatedly performed every time a predetermined time period elapses. Alternatively, the piezoelectric body supply signal determination process may be performed before the start of the printing process and when a predetermined time period elapses from the start of the printing process.

In the first embodiment, the controller 6 identifies, based on the ejection information item Stt, how much the amount of deformation of the piezoelectric body Qm decreased. The amplitude of the residual vibration indicated by the ejection information item Stt decreases as the amount of the deformation of the piezoelectric body Qm decreases. Therefore, it can be said that the ejection information item Stt is information regarding the ink ejection characteristics. The amplitude of the residual vibration is changed by changing the correction value ΔVe.

The inventors found through experiments that in the initial state of the piezoelectric body Qm, the amplitude of the residual vibration is largest when the potential of the constant potential signal Vbs in the liquid ejecting head HU is −2 [V], while the amplitude of the residual vibration is largest when the potential of the constant potential signal Vbs in the liquid ejecting head HU is −2.4 [V] after 10 billion pulses are supplied to the piezoelectric body Qm. Therefore, even after 10 billion pulses are supplied to the piezoelectric body Qm, the controller 6 corrects the potential of the constant potential signal Vbs to −2.4 [V] so that the piezoelectric body Qm can deform by an amount equivalent to the amount of the deformation of the piezoelectric body Qm in the initial state of the piezoelectric body Qm.

To perform the piezoelectric body supply signal determination process, the controller 6 can function as the acquirer 61 and the determiner 62. A specific example of the piezoelectric body supply signal determination process is described with reference to a flowchart of FIG. 17 illustrating an example of the piezoelectric body supply signal determination process.

Figure 17:
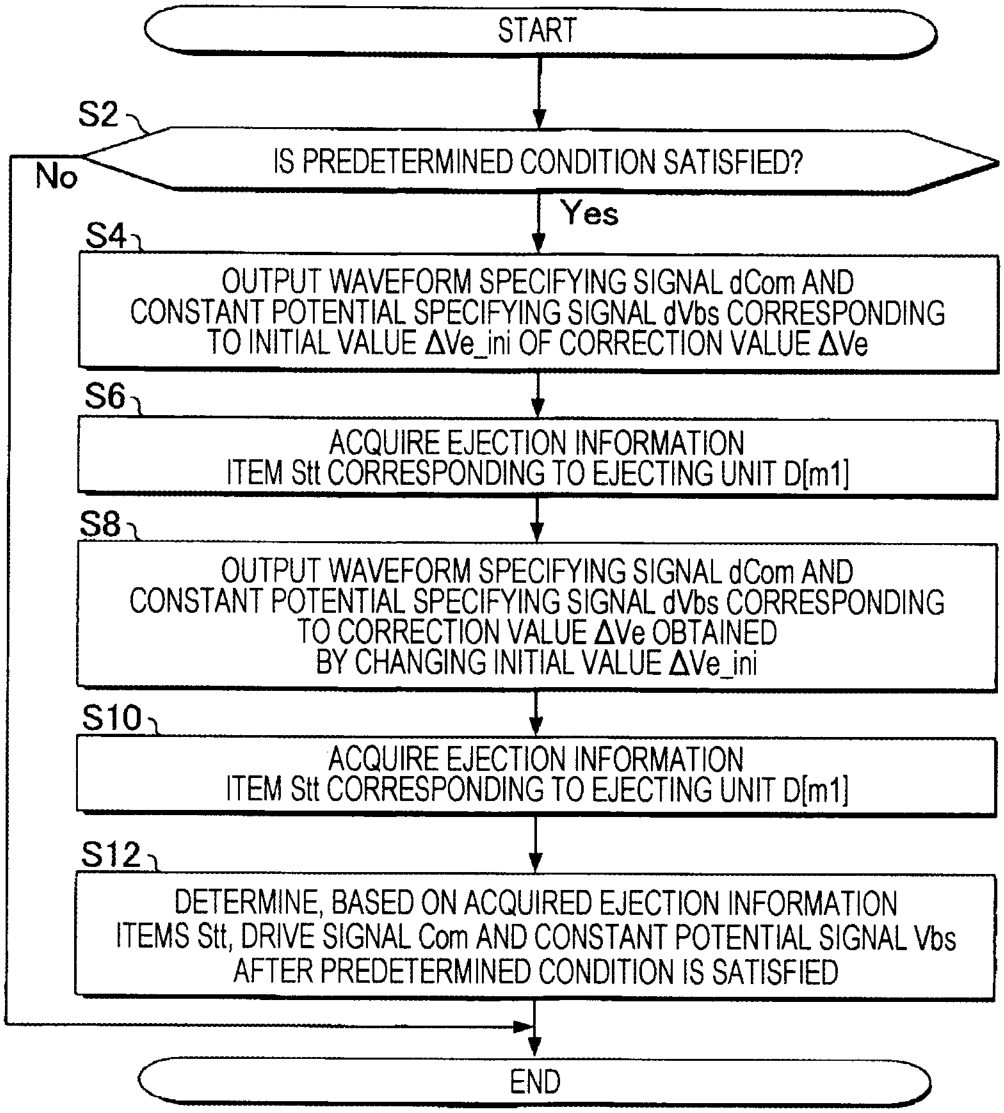
FIG. 17 is a flowchart of an example of a piezoelectric body supply signal determination process.

FIG. 17 is a flowchart illustrating the example of the piezoelectric body supply signal determination process.

The controller 6 determines whether a predetermined condition is satisfied in step S2. The predetermined condition is that the number of times that the piezoelectric body Qm is driven exceeds a predetermined number of times. The predetermined number of times is, for example, determined by a developer of the ink jet printer 1. The developer of the ink jet printer 1 identifies, through experiments or experience, the number of times that the piezoelectric body Qm is driven when the amount of the deformation of the piezoelectric body Qm starts to decrease. The developer of the ink jet printer 1 determines, as the predetermined number of times, the identified number of times that the piezoelectric body Qm is driven. The storage unit 5 stores the determined predetermined number of times. As specific processing of step S2, the controller 6 counts the number of times that any ejecting unit D[m1] among the number M of ejecting units D is driven, and causes the counted value to be stored in the storage unit 5. m1 is an integer of 1 or greater or M or less. In a method of counting the number of times that the ejecting unit D[m1] is driven, when an individual specifying signal Sd[m1] specifies ejection of ink, the controller 6 may recognize that the number of times that the piezoelectric body Qm is driven increased by 1. Then, the controller 6 determines whether the value stored in the storage unit 5 exceeds the predetermined number of times. Regarding the number of times that the ejecting unit D[m1] is driven, the controller 6 may regard an average value of the numbers of times that piezoelectric bodies Qm of a plurality of ejecting units D among the number M of ejecting units D are driven as the number of times that the piezoelectric body Qm is driven.

The predetermined condition is not limited to the condition that the number of times that the piezoelectric body Qm is driven exceeds the predetermined number of times. For example, the predetermined condition may be that a value obtained by multiplying the drive voltage applied to the piezoelectric body Qm by a cumulative driving period for which the piezoelectric body Qm is driven exceeds a predetermined value. The predetermined condition may be that a time period for which a power supply of the ink jet printer 1 is ON exceeds a predetermined time period.

When the result of the determination in step S2 is affirmative, the controller 6 outputs a waveform specifying signal dCom and a constant potential specifying signal dVbs that correspond to an initial value ΔVe_ini of the correction value ΔVe in step S4. By performing the processing in step S4, the drive signal Com corresponding to the initial value ΔVe_ini is supplied to the individual electrode Qd, and the constant potential signal Vbs corresponding to the initial value ΔVe_ini is supplied to the common electrode Qu. For example, when the piezoelectric body supply signal determination process is performed for the first time, the initial value ΔVe_ini is a value determined by the developer of the ink jet printer 1. For example, when the piezoelectric body supply signal determination process is performed for the second and subsequent times, the initial value ΔVe_ini is a correction value ΔVe determined in the piezoelectric body supply signal determination process previously performed.

After the end of the processing of step S4, the acquirer 61 acquires an ejection information item Stt corresponding to the ejecting unit D[m1] in step S6. Specifically, the acquirer 61 selects any ejecting unit D among the number M of ejecting units D as a detection target ejecting unit D-H, supplies the drive signal Com to the individual electrode Qd of the detection target ejecting unit D-H, supplies the constant potential signal Vbs to the common electrode Qu, and acquires the ejection information item Stt from the generating circuit 9 for the first time.

The individual electrode Qd of the ejecting unit D[m1] is an example of a "first electrode". The common electrode Qu is an example of a "second electrode". The pressure chamber 320 of the ejecting unit D[m1] is an example of a "first pressure chamber". The piezoelectric body Qm of the ejecting unit D[m1] is an example of a "first piezoelectric body". The ejection information item Stt acquired in the processing of step S6 is an example of "first information regarding a liquid ejection characteristic". A residual vibration corresponding to the ejection information item Stt acquired in the processing of step S6 is an example of a "first residual vibration". The drive signal Com supplied to the individual electrode Qd in the processing of step S2 is an example of a "first drive signal". The inspection waveform PS included in the drive signal Com supplied to the individual electrode Qd in the processing of step S2 is an example of a "first waveform". The constant potential signal Vbs supplied to the common electrode Qu in the processing of step S2 is an example of a "first constant potential signal". The potential of the constant potential signal Vbs supplied to the common electrode Qu in the processing of step S2 is an example of a "first potential".

After the end of the processing of step S6, the controller 6 outputs a waveform specifying signal dCom and a constant potential specifying signal dVbs that correspond to a correction value ΔVe obtained by changing the initial value ΔVe_ini in step S8. In step S10, the acquirer 61 acquires an ejection information item Stt corresponding to the ejecting unit D[m] to which the signals were supplied in step S4. Since the correction value ΔVe is obtained by changing the initial value ΔVe_ini, the correction value ΔVe is different from the initial value ΔVe_ini. Therefore, the inspection waveform PS of the drive signal Com corresponding to the initial value ΔVe_ini is different from the inspection waveform PS of the drive signal Com corresponding to the correction value ΔVe. In addition, the potential of the constant potential signal Vbs corresponding to the initial value ΔVe_ini is different from the potential of the constant potential signal Vbs corresponding to the correction value ΔVe.

The ejection information item Stt acquired in the processing of step S10 is an example of "second information". A residual vibration corresponding to the ejection information item Stt acquired in the processing of step S10 is an example of a "second residual vibration". The drive signal Com supplied to the individual electrode Qd in the processing of step S8 is an example of a "second drive signal". The inspection waveform PS included in the drive signal Com supplied to the individual electrode Qd in the processing of step S8 is an example of a "second waveform". The constant potential signal Vbs supplied to the common electrode Qu in the processing of step S2 is an example of a "second constant potential signal". The potential of the constant potential signal Vbs supplied to the common electrode Qu in the processing of step S2 is an example of a "second potential".

After the end of the processing of step S10, the determiner 62 determines, based on the two acquired ejection information items Stt, a drive signal Com and a constant potential signal Vbs that are to be supplied to the individual electrode Qd and the common electrode Qu after the predetermined condition is satisfied in step S12. Specifically, the determiner 62 identifies a larger value of the amplitude of the residual vibration indicated by the ejection information item Stt acquired for the first time and the amplitude of the residual vibration indicated by the ejection information item Stt acquired for the second time. Then, the determiner 62 determines the drive signal Com and the constant potential signal Vbs supplied when the residual vibration with the amplitude indicating the larger value occurs as the drive signal Com and the constant potential signal Vbs after the predetermined condition is satisfied.

After the end of the processing of step S12 or when the result of the determination in step S2 is negative, the ink jet printer 1 ends the piezoelectric body supply signal determination process illustrated in FIG. 17.

Steps S6 and S10 correspond to an "acquisition step". Step S12 corresponds to a "determination step".

The piezoelectric body supply signal determination process is not limited to the content illustrated in FIG. 17. For example, the acquirer 61 may change the correction value ΔVe a plurality of times and acquire three or more ejection information items Stt. Then, the determiner 62 may correct the drive signal Com and the constant potential signal Vbs using a correction value ΔVe corresponding to an optimal ejection information item Stt among the acquired three or more ejection information items Stt. The optimal ejection information item Stt is, for example, an ejection information item Stt indicating the closest amplitude to an amplitude determined in advance by the developer of the ink jet printer 1 or an ejection information item Stt indicating the largest amplitude among the acquired three or more ejection information items Stt.

1.7. Conclusion of First Embodiment

As described above, the controller 6 of the ink jet printer 1 according to the first embodiment performs the determination method of determining a piezoelectric body supply signal to be supplied to the individual electrode Qd and the common electrode Qu in order to eject the ink from the liquid ejecting head HU including the pressure chamber 320 of the ejecting unit D[m1], the piezoelectric body Qm that changes pressure applied to the ink in the pressure chamber 320, and the individual electrode Qd and the common electrode Qu that drive the piezoelectric body Qm. The determination method includes an acquisition step of acquiring, when the predetermined condition is satisfied, an ejection information item Stt[m1] when the constant potential signal Vbs corresponding to the initial value ΔVe_ini is supplied to the common electrode Qu and the drive signal Com-B corresponding to the initial value ΔVe_ini is supplied to the individual electrode Qd and an ejection information item Stt[m1] when the constant potential signal Vbs corresponding to the correction value ΔVe obtained by changing the initial value ΔVe_ini is supplied to the common electrode Qu and the drive signal Com-B corresponding to the correction value ΔVe is supplied to the individual electrode Qd, and a determination step of determining, based on the acquired two ejection information items Stt, the piezoelectric body supply signal to be supplied to the individual electrode Qd and the common electrode Qu after the predetermined condition is satisfied.

The acquired two ejection information items Stt are values affected by a decrease in the amount of deformation of the piezoelectric body Qm. Therefore, according to the first embodiment, since the actual decrease in the amount of deformation of the piezoelectric body Qm can be reflected by determining the piezoelectric body supply signal based on the acquired two ejection information items Stt, the piezoelectric body supply signal that enables the ink to be appropriately ejected can be supplied to the individual electrode Qd and the common electrode Qu, as compared with a case where a piezoelectric body supply signal is determined based on only the number of times that the piezoelectric body Qm is driven and an elapsed time period. According to the first embodiment, it is possible to improve the ejection characteristics by supplying, to the individual electrode Qd and the common electrode Qu, the piezoelectric body supply signal that enables the ink to be appropriately ejected.

In addition, as illustrated in FIG. 14, a potential difference ΔV1 obtained by subtracting the constant potential signal Vbs corresponding to the initial value ΔVe_ini from the highest potential of the drive signal Com-B corresponding to the initial value ΔVe_ini is substantially equal to a potential difference ΔV2 obtained by subtracting the constant potential signal Vbs corresponding to the correction value ΔVe from the highest potential of the drive signal Com-B corresponding to the correction value ΔVe.

As a method of increasing the amount of deformation of the piezoelectric body Qm, a method of increasing the magnitude of the drive voltage to be applied to the piezoelectric body Qm can be considered. However, when the magnitude of the drive voltage to be applied to the piezoelectric body Qm is increased, consumption power of the piezoelectric body Qm increases. According to the first embodiment, it is possible to improve the ejection characteristics while the magnitude of the drive voltage to be applied to the piezoelectric body Qm is maintained, that is, consumption power of the piezoelectric body Qm is maintained.

In addition, the acquirer 61 detects a first residual vibration that occurs in the pressure chamber 320 when the drive signal Com-B corresponding to the initial value ΔVe_ini is supplied to the individual electrode Qd and the constant potential signal Vbs corresponding to the initial value ΔVe_ini is supplied to the common electrode Qu. The acquirer 61 acquires an ejection information item Stt corresponding to the result of detecting the first residual vibration. In addition, the acquirer 61 detects a second residual vibration that occurs in the pressure chamber 320 when the drive signal Com-B corresponding to the correction value ΔVe is supplied to the individual electrode Qd and the constant potential signal Vbs corresponding to the correction value ΔVe is supplied to the common electrode Qu. The acquirer 61 acquires an ejection information item Stt corresponding to the result of detecting the second residual vibration.

The acquirer 61 can use the residual vibrations to acquire the ejection information items Stt in which the actual decrease in the amount of the deformation of the piezoelectric body Qm is reflected. In the ink jet printer 1 according to the first embodiment, it is possible to improve the ejection characteristics, as compared with a case where a piezoelectric body supply signal after the predetermined condition is satisfied is determined based on information in which the actual decrease in the amount of deformation of the piezoelectric body Qm is not reflected, for example, the number of times that the piezoelectric body Qm is driven. In addition, the residual vibrations are also used to detect an ejection abnormality. Therefore, since the ink jet printer 1 according to the first embodiment can acquire an ejection information item Stt using a mechanism that is also used to detect an ejection abnormality, the ink jet printer 1 according to the first embodiment may not include a new mechanism for acquiring an ejection information item Stt.

In addition, the predetermined condition is that the number of times that the piezoelectric body Qm of the ejecting unit D[m1] is driven exceeds the predetermined number of times.

The amount of deformation of the piezoelectric body Qm decreases when the piezoelectric body Q is driven a certain number of times. Therefore, when the number of times that the piezoelectric body Qm of the ejecting unit D[m1] is driven is smaller than the predetermined number of times, the acquirer 61 does not acquire an ejection information item Stt and the determiner 62 does not determine a piezoelectric body supply signal in the ink jet printer 1 according to the first embodiment, and thus it is possible to reduce the processing load of the ink jet printer 1 according to the first embodiment.

In addition, the ink jet printer 1 according to the first embodiment includes the liquid ejecting head HU and the controller 6 that determines a piezoelectric body supply signal to be supplied to the individual electrode Qd and the common electrode Qu. The controller 6 includes the acquirer 61 that performs the acquisition step, and the determiner 62 that performs the determination step.

According to the first embodiment, it is possible to improve the ejection characteristics by supplying, to the individual electrode Qd and the common electrode Qu, the piezoelectric body supply signal that enables the ink to be appropriately ejected.

2. Modifications

The embodiment exemplified above may be variously modified. Specific modifications are exemplified below.

Two or more aspects selected from the following exemplification may be combined as appropriate such that the aspects are not mutually inconsistent.

2.1. First Modification

In the first embodiment, ejection information items Stt corresponding to a single ejecting unit D[m1] are acquired, but ejection information items Stt corresponding to a plurality of ejecting units D may be acquired.

Figure 18:
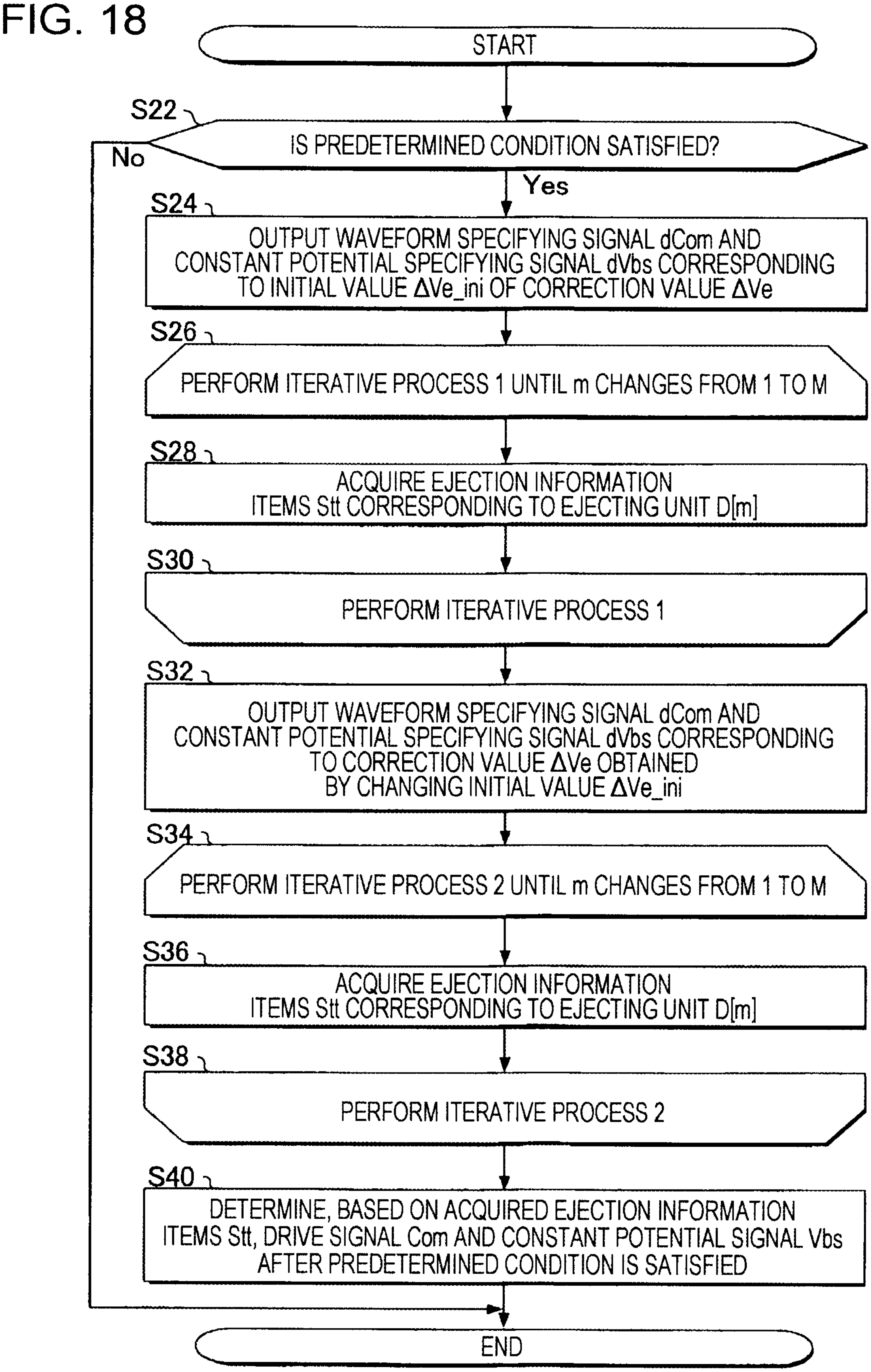
FIG. 18 is a flowchart of an example of a piezoelectric body supply signal determination process according to a first modification.

FIG. 18 is a flowchart illustrating an example of a piezoelectric body supply signal determination process according to the first modification.

The controller 6 determines whether the predetermined condition is satisfied in step S22. When the result of the determination in step S22 is affirmative, the controller 6 outputs a waveform specifying signal dCom and a constant potential specifying signal dVbs that correspond to the initial value ΔVe_ini of the correction value ΔVe in step S24.

After the end of the processing of step S24, the controller 6 performs an iterative process 1 of repeating the processing of steps S26 to S30 until the variable m changes from 1 to M. In step S28, the acquirer 61 selects an ejecting unit D[m] as a detection target ejecting unit D-H and acquires ejection information items Stt corresponding to the ejecting unit D[m].

When an individual electrode Qd of an m1-th ejecting unit D among the number M of ejecting units D is an example of a "first electrode", an individual electrode Qd of an m2-th ejecting unit D among the number M of ejecting units D is an example of a "third electrode". m1 is an integer of 1 or greater and M or less. m2 is an integer of 1 or greater and M or less and is different from m1. The pressure chamber 320 of the ejecting unit D[m2] is an example of a "second pressure chamber". The piezoelectric body Qm of the ejecting unit D[m2] is an example of a "second piezoelectric body". The common electrode Qu is commonly provided for the number M of ejecting units D. An ejection information item Stt[m2] corresponding to the ejecting unit D[m2] and acquired in step S28 is an example of "third information".

After performing the iterative process 1, the controller 6 outputs a waveform specifying signal dCom and a constant potential specifying signal dVbs that correspond to the correction value ΔVe obtained by changing the initial value ΔVe_ini in step S32.

After the end of the processing of step S32, the controller 6 performs an iterative process 2 of repeating the processing of steps S34 to S38 until the variable m changes from 1 to M. In step S36, the acquirer 61 selects an ejecting unit D[m] as a detection target ejecting unit D-H and acquires an ejection information item Stt corresponding to the ejecting unit D[m]. An ejection information item Stt[m2] corresponding to the ejecting unit D[m2] and acquired in step S34 is an example of "fourth information".

After the iterative process 2 is performed, the determiner 62 determines, based on a number 2×M of acquired ejection information items Stt, a piezoelectric body supply signal to be supplied to the common electrode Qu and the individual electrode Qd after the predetermined condition is satisfied in step S40. For example, the determiner 62 identifies, for each of the number M of ejecting units D, a larger value of the amplitude of a residual vibration indicated by an ejection information item Stt acquired in step S28 and the amplitude of a residual vibration indicated by an ejection information item Stt acquired in step S36. Then, the determiner 62 compares the number of ejecting units D in which the amplitudes of residual vibrations indicated by the ejection information items Stt acquired in step S28 are larger than the amplitudes of residual vibrations indicated by the ejection information items Stt acquired in step S36 with the number of ejecting units D in which the amplitudes of residual vibrations indicated by the ejection information items Stt acquired in step S36 are larger than the amplitudes of residual vibrations indicated by the ejection information items Stt acquired in step S28. Then, the determiner 62 determines a drive signal Com and a constant potential signal Vbs that correspond to ejection information items Stt corresponding to the larger number of ejecting units D as a drive signal Com and a constant potential signal Vbs after the predetermined condition is satisfied.

After the end of the processing of step S40 or when the result of the determination in step S22 is negative, the ink jet printer 1 ends the piezoelectric body supply signal determination process illustrated in FIG. 18.

The piezoelectric body supply signal determination process according to the first modification is not limited to the content illustrated in FIG. 18. For example, the acquirer 61 may change correction values ΔVe and acquire three or more ejection information items Stt for each of the number M of ejecting units D. Next, the determiner 62 identifies a correction value ΔVe corresponding to an optimal ejection information item Stt among the acquired three or more ejection information items Stt for each of the number M of ejecting units D. Then, the determiner 62 may correct a drive signal Com and a constant potential signal Vbs using an average value of the correction values ΔVe identified for each of the number M of ejecting units D.

The ink jet printer 1 according to the first modification includes the pressure chamber 320 of the ejecting unit D[m2] in which ink is stored, the piezoelectric body Qm that changes pressure applied to the ink in the pressure chamber 320, and the individual electrode Qd that drives the piezoelectric body Qm. The common electrode Qu is provided for the number M of piezoelectric bodies Qm.

According to the first modification, even when the common electrode Qu is a so-called upper electrode and the individual electrode Qd is a so-called lower electrode, it is possible to improve the ejection characteristics. Therefore, according to the first modification, it is possible to improve the degree of freedom of the configuration of the piezoelectric element PZ.

In addition, in the ink jet printer 1 according to the first modification, when the predetermined condition is satisfied, the acquirer 61 acquires an ejection information item Stt [m2] regarding an ink ejection characteristic by supplying a drive signal Com-B corresponding to the initial value ΔVe_ini to the individual electrode Qd of the ejecting unit D[m2] and supplying a constant potential signal Vbs corresponding to the initial value ΔVe_ini to the common electrode Qu, and acquires an ejection information item Stt[m2] regarding an ink ejection characteristic by supplying a drive signal Com-B corresponding to the correction value ΔVe to the individual electrode Qd of the ejecting unit D[m2] and supplying a constant potential signal Vbs corresponding to the correction value ΔVe to the common electrode Qu. The determiner 62 determines, based on the two ejection information items Stt[m1] and the two ejection information items Stt[m2], a piezoelectric body supply signal to be supplied after the predetermined condition is satisfied.

In the printing process, the numbers of times that the piezoelectric bodies Qm are driven may differ for each of the number M of ejecting units D in general, and decreases in amounts of deformation of the piezoelectric bodies Qm may differ for each of the number M of ejecting units D in general. According to the first modification, it is possible to suppress a significant decrease in the ejection characteristics of the ejecting units D by determining a piezoelectric body supply signal based on the ejection information items Stt of the number M of ejecting units D, as compared with the first embodiment.

In the first modification, although it is described that decreases in amounts of deformation of the piezoelectric bodies Qm may differ for each of the number M of ejecting units D, the controller 6 may control decreases in amounts of deformation of the piezoelectric bodies Qm of the number M of ejecting units D to values close to each other. For example, the controller 6 can control decreases in amounts of deformation of the piezoelectric bodies Qm of the number M of ejecting units D to values close to each other by supplying waveforms that do not cause ejection of ink to ejecting units D that will not eject ink, for example, by supplying the inspection waveform PS to the individual electrodes Qd.

2.2 Second Modification

In each of the aspects described above, the common electrode Qu may be a so-called upper electrode and each of the individual electrodes Qd is a so-called lower electrode.

2.3 Third Modification

In each of the aspects described above, the electrode to which the constant potential signal Vbs is supplied is commonly provided for the piezoelectric bodies Qm of the number M of ejecting units D, but electrodes to which the constant potential signal Vbs is supplied may be individually provided for the piezoelectric bodies Qm of the number M of ejecting units D. The determiner 62 may determine a piezoelectric body supply signal corresponding to different correction values ΔVe for the two electrodes sandwiching the piezoelectric body Qm for each of the number M of ejecting units D.

2.4. Fourth Modification

In each of the aspects described above, the acquirer 61 acquires ejection information items Stt obtained by using residual vibrations, but may acquire information obtained by a method not using a residual vibration.

Figure 19:
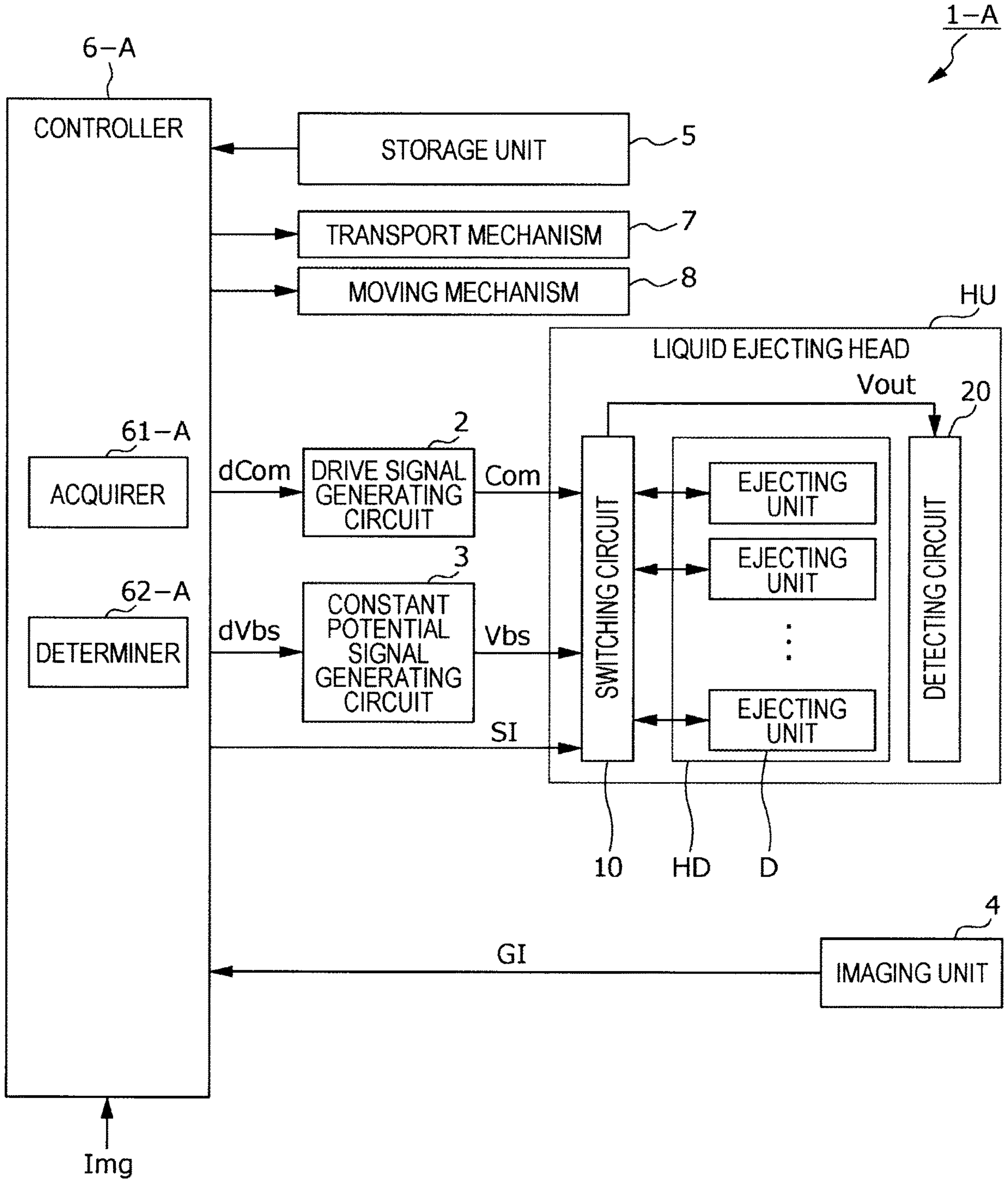
FIG. 19 is a functional block diagram illustrating an example of a configuration of an ink jet printer according to a fourth modification.

FIG. 19 is a functional block diagram illustrating an example of a configuration of an ink jet printer 1-A according to the fourth modification. The ink jet printer 1-A is different from the ink jet printer 1 in that the ink jet printer 1-A includes an imaging unit 4 instead of the generating circuit 9 and includes a controller 6-A instead of the controller 6. The controller 6-A is different from the controller 6 in that the controller 6-A functions as an acquirer 61-A and a determiner 62-A instead of the acquirer 61 and the determiner 62.

In the fourth modification, the controller 6-A performs a printing process of printing an image indicating an inspection pattern. The imaging unit 4 captures an image of the state of ink that landed on the recording sheet P. The imaging unit 4 outputs image information GI indicating the captured image of the state of the ink to the controller 6-A.

When the amount of deformation of the piezoelectric body Qm decreases, the amount of ink ejected decreases. Therefore, one or both of the size of a dot of the ink that landed on the recording sheet P and the height of the dot decreases. It can be said that the image information GI is information corresponding to a result of detecting the state of the ink that landed on the recording sheet P.

The acquirer 61-A detects a first state in which the ink ejected when a drive signal Com corresponding to the initial value ΔVe_ini is supplied to an individual electrode Qd of an ejecting unit D[m1] among the number M of ejecting units D and a constant potential signal Vbs corresponding to the initial value ΔVe_ini is supplied to the common electrode Qu landed on the recording sheet P. The acquirer 61-A acquires image information GI corresponding to a result of detecting the first state. The image information GI acquired for the first time is an example of "first information" in the fourth modification.

Furthermore, the acquirer 61-A detects a second state in which the ink ejected when a drive signal Com corresponding to the correction value ΔVe obtained by changing the initial value ΔVe_ini is supplied to the individual electrode Qd and a constant potential signal Vbs corresponding to the correction value ΔVe is supplied to the common electrode Qu landed on the recording sheet P. The acquirer 61-A acquires image information GI corresponding to a result of detecting the second state. The image information GI acquired for the second time is an example of "second information" in the fourth modification.

The determiner 62-A determines, based on the image information GI acquired for the first and second times, a piezoelectric body supply signal to be supplied to the common electrode Qu and the individual electrode Qd after the predetermined condition is satisfied. Specifically, the determiner 62 identifies a larger one of the size of a dot identified from the image information GI acquired for the first time and the size of a dot identified from the image information GI acquired for the second time. Then, the determiner 62 determines a drive signal Com and a constant potential signal Vbs that are supplied when the larger dot is identified as a drive signal Com and a constant potential signal Vbs after the predetermined condition is satisfied. The determiner 62-A may compare the heights of the dots instead of or in addition to the sizes of the dots.

The acquirer 61-A can acquire image information GI in which the actual decrease in the amount of deformation of the piezoelectric body Qm is reflected. Therefore, in the ink jet printer 1-A according to the fourth modification, it is possible to improve the ejection characteristics, as compared with a case where a piezoelectric body supply signal after the predetermined condition is satisfied is determined based on information in which the actual decrease in the amount of deformation of the piezoelectric body Qm is not reflected, for example, based on the number of times that the piezoelectric body Qm is driven.

2.5. Fifth Modification

The determiner 62-A may determine the ejection speed when the ink is ejected from the nozzle N in the fifth modification, although the determiner 62-A identifies the size of a dot from image information GI in the fourth modification.

When the amount of deformation of the piezoelectric body Qm decreases, the ejection speed of the ink decreases.

The liquid ejecting head HU and the recording sheet P move relative to each other at a predetermined speed. Therefore, when the ejection speed of the ink ejected from the nozzle N decreases, a time period from the time when the ink is ejected to the time when the ink lands on the recording sheet P increases, a relative movement distance between the liquid ejecting head HU and the recording sheet P for the time period increases, and a position where the ink actually lands on the recording sheet P deviates from a position where the ink originally needs to land on the recording sheet P. Therefore, the amount of the deviation of the position where the ink actually lands on the recording sheet P from the position where the ink originally needs to land on the recording sheet P increases in inverse proportion to the ejection speed. It can be said that the amount of the deviation is information in which the actual decrease in the amount of deformation of the piezoelectric body Qm is reflected. The determiner 62-A identifies the amount of the deviation based on image information GI.

The ink jet printer 1-A according to the fifth modification may include a detection plate at a position facing the nozzles N. The detection plate is configured to detect the landing of the ink. The acquirer 61-A may identify the ejection speed of the ink based on the difference between the time when the ink is ejected and the time when the ink lands. When the detection plate detects a change in the electrical characteristics due to the landing of the ink, the detection plate may detect the landing of the ink. When the impact force when the ink lands is converted into an electrical signal, the detection plate may detect the landing of the ink.

2.6. Sixth Modification

In each of the aspects described above, the acquirer 61 acquires an ejection information item Stt[m1] when the constant potential signal Vbs corresponding to the initial value ΔVe_ini is supplied to the common electrode Qu and the drive signal Com-B corresponding to the initial value ΔVe_ini is supplied to the individual electrode Qd, and an ejection information item Stt[m1] when the constant potential signal Vbs corresponding to the correction value ΔVe obtained by changing the initial value ΔVe_ini is supplied to the common electrode Qu and the drive signal Com-B corresponding to the correction value ΔVe is supplied to the individual electrode Qd. However, the acquirer 61 is not limited to thereto. For example, the acquirer 61 may acquire an ejection information item Stt[m1] when the constant potential signal Vbs corresponding to the initial value ΔVe_ini is supplied to the common electrode Qu and the drive signal Com-B corresponding to the initial value ΔVe_ini is supplied to the individual electrode Qd, and an ejection information item Stt[m1] when the constant potential signal Vbs corresponding to the correction value ΔVe is supplied to the common electrode Qu and the drive signal Com-B corresponding to the initial value ΔVe_ini is supplied to the individual electrode Qd. That is, for the first ejection information item Stt[m1] and the second ejection information item Stt[m1], the same drive signal Com may be supplied to the individual electrode Qd.

In the sixth modification, a difference obtained by subtracting the potential of the constant potential signal Vbs corresponding to the initial value ΔVe_ini from the highest potential of the drive signal Com-B corresponding to the initial value ΔVe_ini is different from a difference obtained by subtracting the potential of the constant potential signal Vbs corresponding to the correction value ΔVe from the highest potential of the drive signal Com-B corresponding to the initial value ΔVe_ini.

2.7. Seventh Modification

In each of the aspects described above, while the drive voltage applied to the piezoelectric body Qm is maintained, it is possible to improve the ejection characteristics. However, even when the drive voltage to be applied to the piezoelectric body Qm is shifted to a lower value, the amount of deformation of the piezoelectric body Qm may be insufficient. In this case, the difference between the highest potential VHX of the drive signal Com and the lowest potential VLX of the drive signal Com may be increased.

2.8. Eighth Modification

In the aspect in which an ejection information item Stt[m] is acquired using a residual vibration among the aspects described above, the drive signal Com-B is supplied to the individual electrode Qd, but the controller 6 may supply the drive signal Com-A to the individual electrode Qd.

2.9. Ninth Modification

In each of the aspects described above, the serial ink jet printer 1 in which the transport body 82 storing the liquid ejecting head HU reciprocates in the X axis direction is exemplified. However, the present disclosure is not limited thereto. The ink jet printer may be a line ink jet printer in which a plurality of nozzles N are distributed above the entire width of the recording sheet P.

2.10. Tenth Modification

The ink jet printers exemplified in the aspects described above can be used in various types of equipment such as facsimile machines and copiers, in addition to equipment dedicated to printing. Applications of the liquid ejecting apparatus according to the present disclosure are not limited to printing. For example, a liquid ejecting apparatus that ejects a solution containing a color material is used as a manufacturing device that forms a color filter for a liquid crystal display device. In addition, a liquid ejecting apparatus that ejects a solution containing a conductive material is used as a manufacturing device that forms a wiring and an electrode for a wiring substrate.

2.11. Eleventh Modification

Instead of the configuration described in the first embodiment, the following may be used. Parts not described below are the same as those described in the first embodiment.

In the eleventh modification, the controller 6 sets the ground level GND of the drive signal generating circuit 2 and the ground level GND of the constant potential signal generating circuit 3 to the same value. The drive voltage applied to the piezoelectric body Qm is the difference between the potential applied to the individual electrode Qd and the potential applied to the common electrode Qu. The correction value ΔVe shifts the drive voltage to be applied to the piezoelectric body Qm toward a direction opposite to the polarization direction of the piezoelectric body Qm before the application of the drive voltage to the piezoelectric body Qm. A specific example of the correction value ΔVe is described below using specific examples of the waveform specifying signal dCom and the constant potential specifying signal dVbs.

FIG. 20 is a diagram illustrating an example of the correction value ΔVe corresponding to the waveform specifying signal dCom. FIG. 20 illustrates a value dC0 a value dC3, and a value dC5 among values that the waveform specifying signal dCom received by the drive signal generating circuit 2 can take. When the waveform specifying signal dCom indicates the value dC03 the drive signal generating circuit 2 generates a drive signal Com corresponding to a correction value ΔVe of 0 [V].

Figure 21:
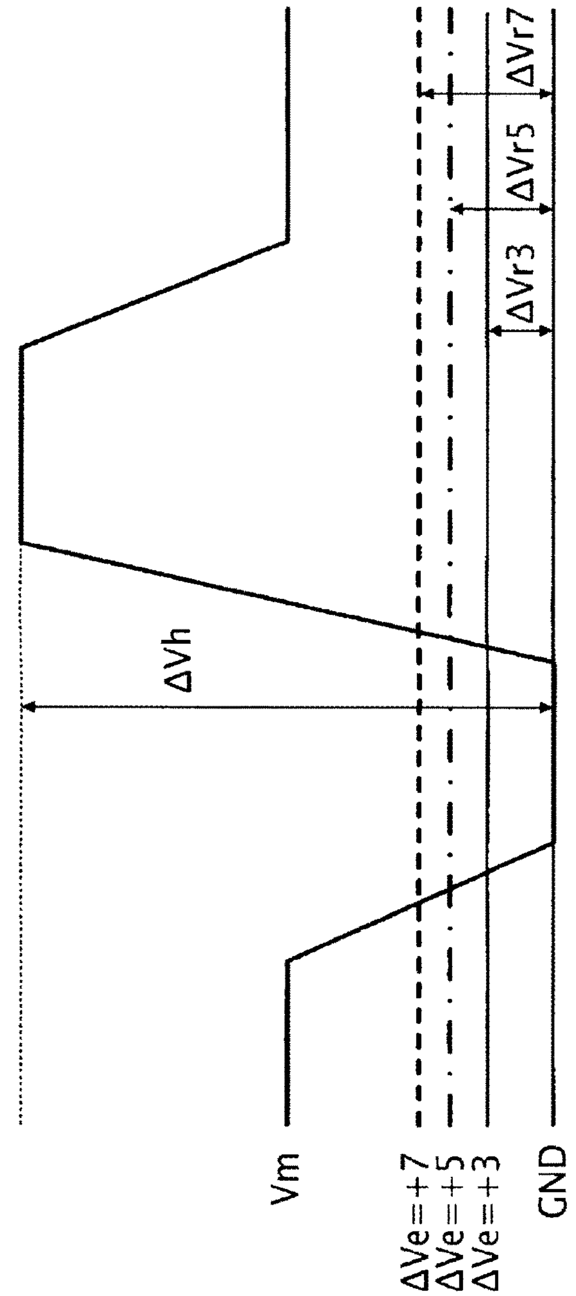
FIG. 21 is a diagram for explaining the eleventh modification.
Figure 22:
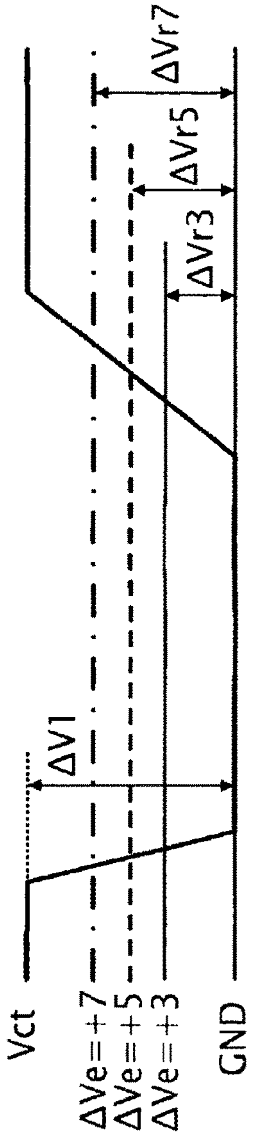
FIG. 22 is a diagram for explaining the eleventh modification.

FIGS. 21 and 22 are diagrams for explaining the drive voltage applied to the piezoelectric body Qm. FIG. 21 illustrates the drive signal Com-A and the constant potential signal Vbs when the correction value ΔVe is 3 [V], the drive signal Com-A and the constant potential signal Vbs when the correction value ΔVe is 5 [V], and the drive signal Com-A and the constant potential signal Vbs when the correction value ΔVe is 7 [V]. FIG. 22 illustrates the drive signal Com-B and the constant potential signal Vbs when the correction value ΔVe is 0 [V], the drive signal Com-B and the constant potential signal Vbs when the correction value ΔVe is −3 [V], and the drive signal Com-B and the constant potential signal Vbs when the correction value ΔVe is −5 [V].

As illustrated in FIGS. 21 and 22, regardless of what the correction value ΔVe is, the potential applied in a direction opposite to the polarization direction of the piezoelectric element PZ before the application of the drive voltage to the piezoelectric body Qm changes without affecting the magnitude ΔVh of the drive voltage applied to the piezoelectric body Qm. Although the example in which the drive signal Com-A is supplied to the individual electrode Qd is described above, an example in which the drive signal Com-B is supplied to the individual electrode Qd is described below.

As illustrated in FIG. 22, a potential difference ΔV1 obtained by subtracting the potential of the constant potential signal Vbs from the highest potential of the drive signal Com-B when the correction value ΔVe is 3 [V] is substantially equal to a potential difference obtained by subtracting the potential of the constant potential signal Vbs from the highest potential of the drive signal Com-B when the correction value ΔVe is the other values. The fact that the potential differences are substantially equal means that the potential differences are completely equal to each other and that the potential differences can be regarded as equal to each other when a manufacturing error is taken into consideration.

What is claimed is:

1. A determination method of determining a supply signal to be supplied to a first electrode and a second electrode in order to eject liquid from a liquid ejecting head including a first pressure chamber in which the liquid is stored, a first piezoelectric body that changes pressure applied to the liquid in the first pressure chamber, and the first electrode and the second electrode that drive the first piezoelectric body, the determination method comprising:

an acquisition step of acquiring, when a predetermined condition is satisfied, first information regarding a liquid ejection characteristic when a first constant potential signal of a first potential is supplied to the second electrode, and second information regarding a liquid ejection characteristic when a second constant potential signal of a second potential different from the first potential is supplied to the second electrode; and a determination step of determining, based on the first information and the second information, the supply signal to be supplied to the first electrode and the second electrode after the predetermined condition is satisfied.

2. The determination method according to claim 1, wherein the acquisition step acquires the first information by supplying, to the first electrode, a first drive signal including a first waveform having a potential that changes over time, and supplying the first constant potential signal to the second electrode, and acquires the second information by supplying, to the first electrode, a second drive signal including a second waveform different from the first waveform and having a potential that changes over time, and supplying the second constant potential signal to the second electrode.

3. The determination method according to claim 2, wherein a difference obtained by subtracting the first potential from a highest potential of the first drive signal is substantially equal to a difference obtained by subtracting the second potential from a highest potential of the second drive signal.

4. The determination method according to claim 2, wherein the acquisition step detects a first residual vibration that occurs in the first pressure chamber when the first drive signal is supplied to the first electrode and the first constant potential signal is supplied to the second electrode, and acquires the first information corresponding to a result of detecting the first residual vibration, and the acquisition step detects a second residual vibration that occurs in the first pressure chamber when the second drive signal is supplied to the first electrode and the second constant potential signal is supplied to the second electrode, and acquires the second information corresponding to a result of detecting the second residual vibration.

5. The determination method according to claim 2, wherein the liquid ejecting head ejects the liquid onto a medium, the acquisition step detects a first state in which the liquid ejected when the first drive signal is supplied to the first electrode and the first constant potential signal is supplied to the second electrode lands on the medium, and acquires the first information corresponding to a result of detecting the first state, and the acquisition step detects a second state in which the liquid ejected when the second drive signal is supplied to the first electrode and the second constant potential signal is supplied to the second electrode lands on the medium, and acquires the second information corresponding to a result of detecting the second state.

6. The determination method according to claim 2, wherein the liquid ejecting head further includes a second pressure chamber in which liquid is stored, a second piezoelectric body that changes pressure applied to the liquid in the second pressure chamber, and a third electrode that drives the second piezoelectric body, and the second electrode is commonly provided for the first piezoelectric body and the second piezoelectric body.

7. The determination method according to claim 6, wherein when the predetermined condition is satisfied, the acquisition step acquires third information regarding a liquid ejection characteristic by supplying the first drive signal to the third electrode and supplying the first constant potential signal to the second electrode, and acquires fourth information regarding a liquid ejection characteristic by supplying the second drive signal to the third electrode and supplying the second constant potential signal to the second electrode, and the determination step determines, based on the first information, the second information, the third information, and the fourth information, the supply signal to be supplied to the first electrode, the second electrode, and the third electrode after the predetermined condition is satisfied.

8. The determination method according to claim 1, wherein the predetermined condition is that the number of times that the first piezoelectric body is driven exceeds a predetermined number of times.

9. A liquid ejecting apparatus comprising:

a liquid ejecting head including a first pressure chamber in which liquid is stored, a first piezoelectric body that changes pressure applied to the liquid in the first pressure chamber, and a first electrode and a second electrode that drive the first piezoelectric body; and a controller that determines a supply signal to be supplied to the first electrode and the second electrode, wherein when a predetermined condition is satisfied, the controller acquires first information regarding a liquid ejection characteristic when a first constant potential signal of a first potential is supplied to the second electrode, and second information regarding a liquid ejection characteristic when a second constant potential signal of a second potential different from the first potential is supplied to the second electrode, and the controller determines, based on the first information and the second information, the supply signal to be supplied to the first electrode and the second electrode after the predetermined condition is satisfied.

* * * * *